United States Patent [19]
Miura et al.

[11] Patent Number: 5,169,718
[45] Date of Patent: Dec. 8, 1992

[54] SLIDING MEMBER

[75] Inventors: Hirohisa Miura, Aichi; Mamoru Okamoto, Aichi; Shoichi Tsuchiya, Toyota; Yoshio Fuwa, Toyota; Hirohumi Michioka, Toyota; Yoshiteru Nakagawa, Yamatokoriyama; Satoru Nakatani, Takatsuki, all of Japan

[73] Assignees: Toyota Jidosha Kabushiki Kaisha; Osaka Gas Company Limited, both of Japan

[21] Appl. No.: 540,002

[22] Filed: Jun. 19, 1990

[30] Foreign Application Priority Data

Jun. 22, 1989 [JP] Japan .................................. 1-160240
Dec. 29, 1989 [JP] Japan .................................. 1-341883

[51] Int. Cl.$^5$ .................... B32B 9/00; B32B 18/00; C04B 35/76
[52] U.S. Cl. .................................. 428/408; 428/367; 428/698; 428/699; 428/702; 428/704; 501/95; 501/99; 252/504; 252/506; 252/507
[58] Field of Search ............. 428/408, 698, 699, 366, 428/367, 702, 704; 264/29.5; 423/447; 252/503, 504, 505, 506, 507; 501/95, 99

[56] References Cited

U.S. PATENT DOCUMENTS

| | | | |
|---|---|---|---|
| 3,261,697 | 7/1966 | Parker et al. | 252/506 |
| 3,300,667 | 11/1963 | Boes et al. | 252/506 |
| 3,454,362 | 7/1969 | Spry | 423/448 |
| 3,498,929 | 7/1969 | Accountius | 252/503 |
| 3,627,551 | 12/1971 | Olstowski | 252/506 |
| 3,790,393 | 2/1974 | Cowland et al. | 106/56 |
| 3,814,642 | 12/1974 | Araki et al. | 428/408 |
| 3,943,213 | 3/1976 | Whittaker et al. | 423/448 |
| 3,956,436 | 5/1976 | Honda | 423/448 |
| 4,101,354 | 7/1978 | Shaffer | 264/29.5 |
| 4,119,189 | 10/1978 | Ehrenreich | 428/408 |

(List continued on next page.)

FOREIGN PATENT DOCUMENTS 2165029 8/1972 Fed. Rep. of Germany .
51-106107 9/1976 Japan .
60-200867 10/1985 Japan .
62-148366 7/1987 Japan .
63-206351 8/1988 Japan .
63-265863 11/1988 Japan .
63-319258 12/1988 Japan .

OTHER PUBLICATIONS

Chemical Abstracts, vol. 110, May 1989, p. 330, 159377q.
Chemical Abstracts, vol. 106, Apr. 1987, p. 308, 106975u.
Chemical Abstracts, vol. 108, Jun. 1988, p. 260, 225867m.
Chemical Abstracts, vol. 108, Apr. 1988, p. 342, 117717d.
European Search Report.

*Primary Examiner*—Ellis P. Robinson
*Assistant Examiner*—Timothy Speer
*Attorney, Agent, or Firm*—Finnegan, Henderson, Farabow, Garrett & Dunner

[57] ABSTRACT

Disclosed is a sliding member having a predetermined shape and including: a sintered body obtained by sintering a composite body including: preliminary carbonized carbonaceous fiber; inorganic powder or inorganic fiber; and self-sintering carbonaceous powder with the preliminarily carbonized carbonaceous fiber and the inorganic powder or the inorganic fiber buried therein. The sliding member has a high and stable friction coefficient ($\mu$), high strength, excellent abrasion resistance, and is manufacturable at a low cost. Further, the friction coefficient ($\mu$) and the other properties of the sliding member can be controlled depending on an application of a sliding member by selecting an optimum inorganic powder or inorganic fiber. Particularly, when boron compound powder is selected as the inorganic powder, the friction coefficient ($\mu$) of the sliding member can be suppressed to 0.15 or less, and the load at seizure thereof can be improved to 100 kgf/cm$^2$ or more.

57 Claims, 9 Drawing Sheets

U.S. PATENT DOCUMENTS

| | | | |
|---|---|---|---|
| 4,220,884 | 9/1980 | Sternbergh | 252/503 |
| 4,225,569 | 9/1980 | Matsui et al. | 423/445 |
| 4,347,279 | 8/1982 | Saji et al. | 428/408 |
| 4,659,444 | 4/1987 | Iwata et al. | 264/29.5 |
| 4,671,907 | 6/1987 | Iwahashi et al. | 423/445 |
| 4,873,071 | 10/1989 | Yamada et al. | 264/29.1 |
| 4,883,617 | 11/1989 | Benn et al. | 264/29.1 |
| 4,894,286 | 1/1990 | Gray | 428/704 |
| 4,958,998 | 9/1990 | Yamauchi et al. | 252/504 |
| 4,981,751 | 1/1991 | Daumit et al. | 428/408 |
| 4,983,451 | 1/1991 | Sugino et al. | 428/408 |
| 4,986,943 | 1/1991 | Sheaffer et al. | 423/447.4 |
| 5,039,341 | 8/1991 | Cooper et al. | 106/56 |
| 5,051,300 | 9/1991 | Rousseau | 428/702 |

SLIDING MEMBER

BACKGROUND OF THE INVENTION

1. Field of the Invention

The present invention relates to a sliding member having high strength and excellent heat resistance, abrasion resistance and oxidation resistance. The sliding member is suitable for making a brake shoe, a brake lining, a brake pad, a bush, a thrust washer, a piston ring, vanes, rotors and sleeves of pumps, a bearing for a high temperature application and the like for an aircraft, a racing car and so on.

The sliding member of the present invention can be applied to both of a dry type friction member and a wet type friction member. Further, the sliding member of the present invention can be made into a sliding member having a low friction coefficient and excellent anti-seizure properties under a dry sliding condition and being applicable to a mechanical structural body, thereby contributing to reduce the frictional loss thereof.

2. Description of the Prior Art

A sliding member used in a brake shoe component member the like for an aircraft, a racing car and so on especially requires heat resistance and abrasion resistance. On the contrary, since a sliding portion of a mechanical structural body has poor anti-seizure properties, the sliding portion is usually used under an oil lubrication condition. As for a sliding member used under a dry condition, a sintered material impregnated with an oil, a copper sintered alloy and a carbon material have been well known. As for the carbon material, the following carbon materials have been used, i.e., a carbon material made by burning and solidifying a carbonaceous powder and the other carbon material made by sintering a carbonaceous powder at a high temperature to graphitize the carbonaceous powder.

Recently, carbon fiber reinforced carbon has been provided for the above-mentioned applications, and is said to be a material improving the strength of the conventional carbon materials. According to Japanese Unexamined Patent Publication (KOKAI) No. 206351/1988, this carbon fiber reinforced carbon is produced by impregnating a liquid carbonaceous material, such as tar, pitch and thermosetting resin, which works as a binder into carbon fiber which works as a reinforcement and which has been carbonized or graphitized and further subjected to a surface treatment like oxidation. Then, the resulting binder impregnated carbon fiber is burned in an inert gas atmosphere. If necessary, the resulting sintered product is graphitized thereafter.

Since the carbon fiber reinforced carbon thus produced uses the liquid carbonaceous material as the binder, volatile substances are generated by the decomposition of the liquid carbonaceous material during the burning, thereby forming pores. Accordingly, the boundary adhesion between the reinforcement and the binder deteriorates, and the density of the product decreases. Consequently, the product is inferior in the strength and the abrasion resistance.

To solve the above-mentioned problems, the pores of the product have been repeatedly filled with a liquid impregnant working as a binder, and the product has been repeatedly re-burned to decrease the porosity. However, in spite of these complicated processes, the product thus obtained has been still porous. In addition, these complicated processes have resulted in the increasing manufacturing cost.

Further, the above-mentioned conventional carbon fiber reinforced carbon suffers from a low friction coefficient ($\mu$) especially under a low load.

Furthermore, through the above-mentioned conventional carbon fiber reinforced carbon has been known to be superior in the anti-seizure properties, it is seized at the load of 50 to 75 kgf/cm$^2$ which is as much as 3 to 4 times that of steel for a structural application under a dry condition. In addition, since the carbon fiber reinforced carbon only exhibits the friction coefficient ($\mu$) of 0.2 to 0.5 under a dry condition, it is not a material of a low friction coefficient, nor a suitable material for a sliding portion of a mechanical structural body.

SUMMARY OF THE INVENTION

The present invention has been developed in view of these problems, and it is therefore an object of the present invention to provide a sliding member having high strength and an excellent friction/abrasion property and being manufacturable at a low cost.

Further, it is another object of the present invention to provide a sliding member having high strength, excellent abrasion resistance, high anti-seizure properties, i.e., exhibiting a load of 100 kgf/cm$^2$ or more at seizure, and exhibiting a friction coefficient of 0.15 or less.

A sliding member according to the present invention has a predetermined shape, and comprises a sintered body obtained by sintering a composite body comprising: preliminarily carbonized carbonaceous fiber; inorganic powder or inorganic fiber; and self-sintering carbonaceous powder with the preliminarily carbonized carbonaceous fiber and the inorganic powder or the inorganic fiber buried therein.

In particular, a sliding member according to the present invention which is suitable for a sliding portion of a mechanical structural body has a predetermined shape, and comprises a sintered body obtained by sintering a composite body comprising: preliminarily carbonized carbonaceous fiber; boron compound powder; and self-sintering carbonaceous powder with the preliminarily carbonized carbonaceous fiber and the boron compound powder buried therein.

The shape of the sliding member is not restricted particularly. For example, the sliding member may be made into a predetermined shape of a brake shoe, a brake lining, a brake pad, a piston ring, a bearing and the like.

The preliminarily carbonized carbonaceous fiber constitutes a reinforcement of the sliding member of the present invention. The raw material of the preliminarily carbonized carbonaceous fiber is not restricted particularly. For example, the raw material may be PAN (polyacrylonitrile), rayon, or pitch and the like.

Here, the preliminarily carbonized carbonaceous fiber is a carbonaceous fiber which has not been subjected to an ordinary carbonizing treatment. In other words, it is a carbonaceous fiber which can accept further carbonizing when it is further subjected to a heat treatment. To be concrete, when raw pitch is employed, the preliminarily carbonized carbonaceous fiber may be spun fiber itself or infusible fiber obtained by making the spun fiber infusible at a temperature of less than 550° C. When polymer fiber such as PAN fiber is employed, the preliminarily carbonized carbonaceous fiber may be polymer fiber which has got through a decomposition process and is prior to a graphitizing treatment. As for the carbonaceous fiber of this type, spun pitch fiber obtained by spinning coal or petroleum raw pitch and infusible fiber obtained by making the spun pitch fiber infusible.

The spinning of the raw pitch and the infusible treatment may be carried out according to ordinary methods, and the conditions therefor are not restricted particularly. In most cases, the pitch fiber may be obtained in the following manner: The raw pitch is supplied in a spinning machine, heated at the temperature of about 300° to 400° C., and extruded through a nozzle of the spinning machine by applying a pressure of an inert gas. The pitch fiber thus obtained may be made into the infusible pitch fiber by heating the pitch fiber at 150° to 500° C. for 0.5 to 5 hours in an oxidizing atmosphere. Here, the raw pitch may be either optically isotropic or optically anisotropic.

As for the fiber length of the preliminarily carbonized carbonaceous fiber, either the short fiber or the long fiber thereof may be used. When using the short fiber, the fiber length thereof may be 0.01 to 50 mm, and particularly the short fiber having the length of 0.03 to 10 mm is preferred in view of the easy mixing and the aspect ratio. When it is too long, the fibers get entangled to deteriorate the dispersibility and finally the product isotropy, one of the important properties of the product. When it is less than 0.01 mm, the strength of the product decreases sharply. As for the fiber diameter thereof, 5 to 25 μm is preferred. Further, a non-woven fabric or a coating fabric made of these fibers may be used.

In addition, the preliminarily carbonized carbonaceous fiber may be preferably subjected to a surface treatment using a viscous material such as tar, pitch and organic polymer in order to improve the affinity with a binder. This surface treatment may be carried out by stirring 100 parts by weight of the preliminarily carbonized carbonaceous fiber with 100 to 1000 parts by weight of the viscous material. The mixture is then washed with an organic solvent, and dried.

The tar or pitch used for the surface treatment may be derived either from coal or petroleum. When the pitch is used, a heat treatment of about 140° to 170° C. is required during the stirring. The tar is accordingly more preferred for the viscous material. Further, coal tar is much more preferred in view of the carbonization material loss in the subsequent carbonizing and graphitizing processes.

The organic polymer used for the surface treatment may be phenol resin, polyvinyl chloride, polyvinyl alcohol and the like.

The organic solvent used for the washing of the surface treatment may be an aromatic solvent such as toluene and xylene. The washing is carried out by stirring 100 parts by weight of the mixture of the preliminarily carbonized carbonaceous fiber and the viscous material with 100 to 1000 parts by weight of the organic solvent, thereby removing light oil components containing many volatile substances. The preliminarily carbonized carbonaceous fiber thus washed is dried by heating and/or depressurizing in a non-oxidizing atmosphere such as nitrogen and argon. The drying is not restricted to the above as far as the organic solvent employed for the washing can be removed.

Further, the preliminarily carbonized carbonaceous fiber thus surface-treated and dried is dispersed, if required, since the dried preliminarily carbonized carbonaceous fiber may sometimes come together in a mass or aggregate. If such is the case, the dispersion may be carried out by an ordinary means such as a powder mill, an atomizer, a pulverizer and the like.

The inorganic powder or the inorganic fiber constitutes the reinforcement of the sliding member of the present invention together with the preliminarily carbonized carbonaceous fiber. Depending on a specific application of a sliding member to be manufactured, the inorganic powder or the inorganic fiber is added in order to increase the friction coefficient ($\mu$) of the sliding member and make it stable, or in order to give the sliding member high abrasion resistance and high anti-seizure properties even when the sliding member has a friction coefficient ($\mu$) of a low value. The inorganic powder or the organic fiber may preferably be one having the melting point of 1000° C. or higher and being not reactable with carbon, and may more preferably be one having the hardness of 1000 Hv or more as well.

As for the inorganic substance therefor, inorganic oxide, inorganic carbide, inorganic nitride, inorganic boride and the like may be used. The inorganic oxide may be $Al_2O_3$, $TiO_2$, $ZrO_2$, MgO and the like. The inorganic carbide may be $B_4C$, TiC, TaC, ZrC and the like. The inorganic nitride may be BN, TiN, $Cr_2N$, TaN, AlN, ZrN and the like. The inorganic boride may be $TiB_2$, $ZrB_2$, $B_4C$, NiB, CoB, BN, $TaB_2$ and the like. Further, inorganic substances of Fe, Mn, Mo, Ni, Nb, Si, V, Ti, W and the like may be used. Besides, these inorganic substances may be added in their metallic states. Moreover, the inorganic fiber includes whisker and ceramic fiber.

By selecting an optimum one from the abovementioned inorganic powders or inorganic fibers, the properties, i.e., the friction coefficient ($\mu$), the abrasion resistance, the anti-seizure properties and the like, may be controlled to optimum properties depending on an application of a sliding member. Particularly, in order to make the sliding member suitable for a sliding portion of a mechanical structural body, namely in order to make a completed product into a sliding member having high strength, excellent abrasion resistance, high anti-seizure properties, i.e., exhibiting a load of 100 kgf/cm$^2$ or more at seizure, and exhibiting a friction coefficient of 0.15 or less, a boron compound may be used for the inorganic powder.

As for the boron compound, it is preferable to use a boron compound which does not decompose or fuse at a temperature less than the sintering temperature. However, a boron compound which decomposes at the sintering temperature may be used in the case that the boron compound, such as $MgB_2$ and CoB decomposing at a sintering temperature, decomposes to produce boron and the decomposed boron reacts with carbon to produce boron carbide. As for the boron compound, boron carbide, boron nitride and the like may be used. Additionally, boride of Cr, Ti, Ta, Zr, Al, Ni, Mg, Nb, Mn, Fe, V, W and the like may be used. Besides, the additives may be added in their metallic states.

When the inorganic powder is used as the inorganic substance, the average particle diameter thereof is preferred to fall in the range of 0.1 to 5 μm in view of the affinity with the matrix, the dispersibility and the strength and abrasion resistance of the completed sintered body. It is more preferred to fall in the range of 0.2 to 4 μm.

When the inorganic fiber is used as the inorganic substance, the diameter and the length thereof are preferred to fall in the ranges of 0.7 to 40 μm and 0.01 to 8 mm respectively in view of the affinity with the matrix, the dispersibility, the strength and abrasion resistance of the completed sintered body and the removability of the inorganic fiber. They are more preferred to fall in the ranges of 1 to 15 μm and 0.05 to 3 mm respectively.

Particularly, when the boron compound is used as the inorganic powder in order to make the sliding member suitable for a sliding portion of a mechanical structural body, the average particle diameter of the boron compound is preferred to fall in the range of 0.1 to 10 μm, and more preferred to fall in the range of 0.3 to 5 μm. When it is less than 0.1 μm, it is hard to mix the boron compound with the preliminarily carbonized carbonaceous fiber and the self-sintering carbonaceous powder uniformly. When it is more than 10 μm, the possibility of the abnormal or aggressive abrasion increases.

The self-sintering carbonaceous powder constitutes a binder of the sliding member according to the present invention. The self-sintering carbonaceous powder is a powder having a self-sintering property and being preliminarily carbonized or not being completely carbonized. The self-sintering carbonaceous powder may be derived either from coal or petroleum. To be concrete, mesocarbon microbeads, pulverized bulk mesophase powder, pulverized low temperature calcined coke powder and the like may be used. In particular, the mesocarbon microbeads of coal or petroleum is preferred among them in view of its uniform and stable particle diameter and composition. Further, the mesocarbon microbeads of coal is more preferred in view of the carbonization material loss in the carbonizing process. The self-sintering carbonaceous powder having the average particle diameter of 30 μm or less and the β-resin amount falling in the range of 3 to 50% is preferred. Furthermore, the β-resin amount may more preferably fall in the range of 6 to 30%, and it may much more preferably fall in the range of 8 to 25%.

The sliding member of the present invention may be manufactured, for instance, by a simple manufacturing process illustrated in FIG. 13 and comprising a dry mixing step, a dry molding step and a burning step.

The preliminarily carbonized carbonaceous fiber, the inorganic powder or the inorganic fiber and the self-sintering cabonaceous powder is mixed and molded into a composite body. The mixing method is not restricted particularly, however it is preferred to uniformly mix the above-mentioned raw materials in order to make the strength and the abrasion resistance of the product isotropic. Here, the composition of the self-sintering carbonaceous powder and the preliminarily carbonized carbonaceous fiber may be 100 parts by weight of the former to 2 to 70 parts by weight of the latter. More preferably, it may be 100 parts by weight of the former to 10 to 50 parts by weight of the latter. Further, the addition amount of the inorganic powder or the inorganic fiber may preferably be 3 to 30% by weight with respect to the whole amount of the raw materials taken as 100% by weight. More preferably, it may be 5 to 10% by weight with respect to the whole amount.

In particular, when the boron compound is used as the inorganic powder in order to make the sliding member suitable for a sliding portion of a mechanical structural body, the addition amount of the boron compound may preferably be 1 to 50% by weight with respect to the whole amount of the raw materials taken as 100% by weight. More preferably, it may be 3 to 35% by weight with respect to the whole amount. When the addition amount of the boron compound is more than 50% by weight, the machinability of the sintered body becomes improper and the strength thereof deteriorates slightly.

The molding operation of the sliding member according to the present invention may be carried out by an ordinary molding method. In the molding operation, a mixture of the preliminarily carbonized carbonaceous fiber, the inorganic powder or the inorganic fiber and the self-sintering carbonaceous powder is usually molded into a predetermined shape in a mold while applying the pressure of 1 to 10 ton/cm$^2$. Or the molding operation may be done by the CIP method, the HIP method, the hot pressing method and the like. The molding operation may be carried out at an ordinary temperature to 500° C. in an inert gas atmosphere.

The composite body is sintered, and made into the sliding member of the present invention. Here, the sintering is to carbonize and solidify the preliminarily carbonized carbonaceous fiber and the self-sintering carbonaceous powder by burning at about 700° to 1500° C. under an ordinary pressure. Further, the thus carbonized and solidified composite body may be graphitized by heating to the sintering temperature or more in a graphitizing furnace, if necessary.

The conditions of the carbonizing are not restricted particularly. The carbonizing may usually be carried out by increasing the temperature starting at an ordinary temperature to about 1500° C. at the rate of about 0.1° to 300° C./hour and by keeping the temperature of about 1500° C. for about 0.5 to 10 hours in a non-oxidizing atmosphere. Moreover, also during the sintering, part of the composite body is graphitized by heating to a higher temperature after the carbonizing.

Likewise, the conditions of the graphitizing are not restricted particularly. The graphitizing may be carried out by increasing the temperature starting at the sintering temperature to the temperature of 1500° to 3000° C. at the rate of about 0.1° to 500° C./hour and by keeping the temperature of about 1500° to 3000° C. for about 0.5 to 10 hours in a non-oxidizing atmosphere. When the composite body is graphitized, the graphite crystals have grown fully and oriented orderly to improve the density, strength and abrasion resistance of the product.

In the sliding member of the present invention, the composite body before the sintering comprises: the preliminarily carbonized carbonaceous fiber; the inorganic powder or the inorganic fiber; and the self-sintering carbonaceous powder with the preliminarily carbonized carbonaceous fiber and the inorganic powder or the inorganic fiber buried therein.

Accordingly, when the composite body is sintered, the preliminarily carbonized carbonaceous fiber working as the reinforcement and the self-sintering carbonaceous powder working as the binder come to have substantially the same physical properties on the strength, the shrinkage rate and the like, because the preliminarily carbonized carbonaceous fiber is uncarbonized or has not been completely carbonized yet. As a result, the boundary adhesion between the preliminarily carbonized carbonaceous fiber and the self-sintering carbonaceous powder has been improved, whereby the high strength and excellent abrasion resistance can be obtained. In short, when the composite body is sintered, both of the preliminarily carbonized ones, i.e., the preliminarily carbonized carbonaceous fiber and the self-sintering carbonaceous powder, shrink by substantially the equal degree and get together, whereby the boundary adhesion therebetween has been improved. Thus, the strength and abrasion resistance of the sliding member have been improved.

Further, by adding the inorganic powder or the inorganic fiber, a mechanical resistance force is exerted between the sliding member and a mating member, thereby making the friction coefficient ($\mu$) high and stable. Namely, since the added inorganic powder or inorganic fiber exerts a mechanical resistance force to the mating member, the friction coefficient ($\mu$) of the sliding member becomes high and stable.

For instance, when the inorganic powder is added, the inorganic powder becomes likely to be removed from the carbon matrix portion as the increment of load because the inorganic powder is in a powder form. The removal of the inorganic powder balances the adhesion of the carbon matrix, thereby making the friction coefficient ($\mu$) stable aginst the fluctuation of load. On the contrary, when the inorganic fiber is added, the inorganic fiber becomes less likely to be removed from the carbon matrix portion as the increment of load because the inorganic fiber is in a fiber form. Thus, the sliding member comes to exhibit a friction coefficient ($\mu$) of an extremely high value.

Furthermore, the self-sintering carbonaceous powder working as the binder has got rid of the conventional binder comprising the liquid carbonaceous material as mentioned earlier. Therefore, it is not necessary to carry out the re-impregnating and reburning for repeatedly filling the pores resulting from the conventional liquid carbonaceous material, and the sliding member of the present invention can be manufactured by the above-mentioned simple process, illustrated in FIG. 13 and comprising a dry mixing step, a dry molding step and a burning step, at a low cost accordingly.

Moreover, by selecting an optimum inorganic powder or inorganic fiber, the friction coefficient ($\mu$) of a completed sliding member can be controlled to an optimum value depending on an application thereof. In particular, in the case that the boron compound is added in order to make the sliding member suitable for a sliding portion of a mechanical structural body, the boron compound is thermally decomposed, thereby generating the liquid phase thereof, when a high load is applied to the sliding member, namely when the sliding member is subjected to a high temperature. The liquid phase of the boron compound improves the anti-seizure properties of the sliding member, and thus it is believed that the friction coefficient ($\mu$) of thereof can be suppressed to a low value.

For instance, when the inorganic boride is used as the inorganic powder, the friction coefficient ($\mu$) of the sliding member can be controlled in the range of 0.05 to 0.2. When the inorganic carbide is used as the inorganic powder, the friction coefficient ($\mu$) of the sliding member can be controlled in the range of 0.15 to 0.35. When the inorganic nitride is used as the inorganic powder, the friction coefficient ($\mu$) of the sliding member can be controlled in the range of 0.1 to 0.35. When the inorganic oxide is used as the inorganic powder, the friction coefficient ($\mu$) of the sliding member can be controlled in the range of 0.25 to 0.5.

Here, it is believed that the friction coefficient ($\mu$) of the sliding member is varied greatly by the addition of the inorganic powder or the inorganic fiber because the state of the inorganic powder or the inorganic fiber is varied by the heat generation associating with the sliding movement. For instance, since the oxide has high heat resistance and keeps the particle or fiber configuration during the sliding movement, the sliding member is believed to exhibit a higher friction coefficient ($\mu$) accordingly. Contrary to the oxide, since the boride is decomposed by the heat generation during the sliding movement and produces the liquid phase, the boride is believed to decrease the friction coefficient ($\mu$) of the sliding member.

In addition, when the preliminarily carbonized carbonaceous fiber is subjected to the surface treatment using the viscous material such as tar, pitch and organic polymer, the wettability of the boundary surface of the preliminarily carbonized carbonaceous fiber increases. The boundary adhesion between the preliminarily carbonized carbonaceous fiber and the self-sintering carbonaceous powder working as the binder has been thus further improved because the affinity between the preliminarily carbonized carbonaceous fiber and the self-sintering carbonaceous powder has been increased.

As described so far, the sliding member of the present invention has excellent properties such as high strength, high heat resistance, high abrasion resistance, high oxidation resistance and the like, it can be applied to a brake shoe, a brake lining, a brake pad, a bush, a thrust washer, a piston ring, vanes, rotors and sleeves of pumps, a bearing for a high temperature application and the like for an aircraft, a racing car and so on. In addition, it is expected that the sliding member may be applied to electrodes such as electrodes for electrical discharge machining, carbon electrodes and the like.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS OF THE INVENTION

Figure 1:
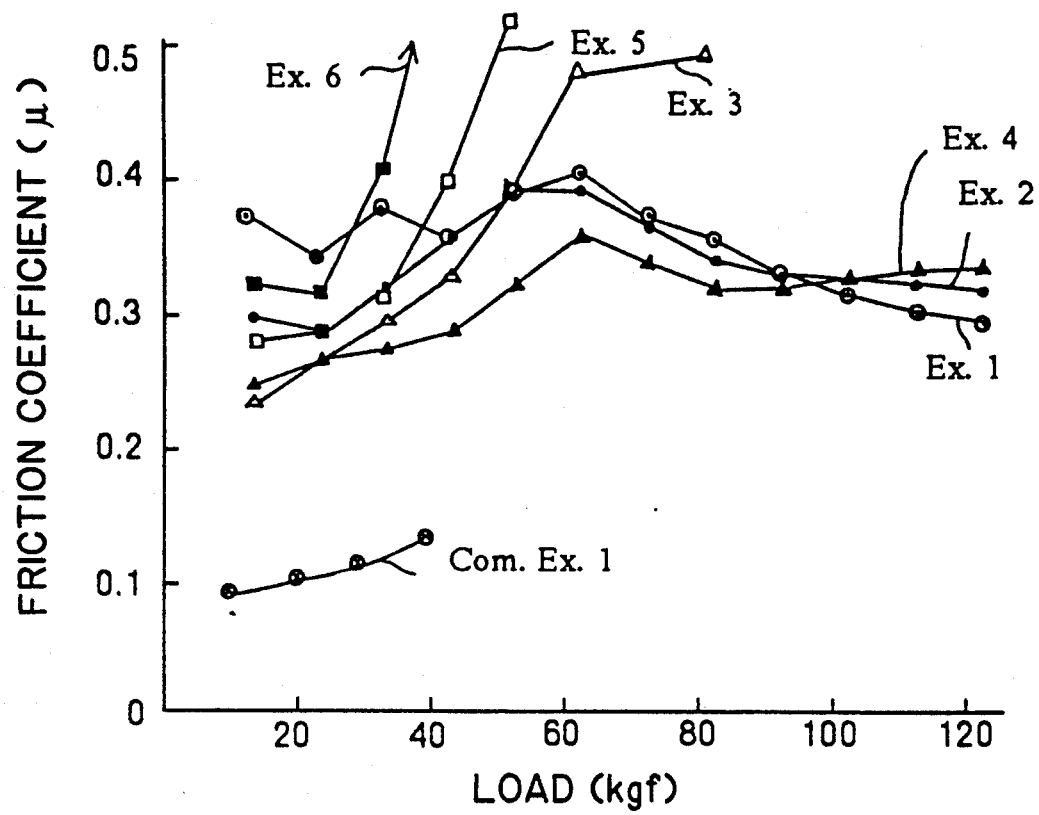
FIG. 1 is a line chart showing the results of the measurement on the friction coefficients ($\mu$ under no lubrication condition) of the sliding members of Examples 1 through 6 and Comparative Example 1.

Having generally described the present invention, a further understanding can be obtained by reference to certain specific preferred embodiments which are provided herein for purposes of illustration only and are not intended to be limiting unless otherwise specified.

EXAMPLE 1

Preliminarily carbonized carbonaceous fiber comprising infusible fiber was prepared. The infusible fiber was made from optically isotropic coal pitch by an ordinary method, and had the fiber diameter of 15 $\mu$m and the fiber length of 0.5 mm. Then, 500 parts by weight of tar was added to 100 parts by weight of this preliminarily carbonized carbonaceous fiber working as the reinforcement. The mixture was stirred at an ordinary temperature for 15 minutes and filtered thereafter. Further, 500 parts by weight of toluene was added thereto, stirred for 30 minutes, filtered, and dried at 150° C. in a nitrogen atmosphere for 3 hours to make tar-treated infusible preliminarily carbonized carbonaceous fiber.

A mixture was then prepared which included 30% by weight of the tar-treated infusible preliminarily carbonized carbonaceous fiber thus obtained and 70% by weight of a self-sintering carbonaceous powder comprising coal tar mesocarbon microbeads and working as the binder. The coal tar mesocarbon microbeads had the average particle diameter of 7 $\mu$m. Then, 5% by weight of $Al_2O_3$ having the average particle diameter of 0.5 $\mu$m as the inorganic powder was mixed uniformly with 95% by weight of the mixture, and a resulting mixture was put into a mold and molded into a composite body having a predetemined shape of a sliding member by applying the molding pressure of 2 ton/cm².

Next, the resulting composite body was burned by increasing the temperature from an ordinary temperature to 1000° C. at the rate of 150° C./hour and by maintaining the temperature of 1000° C. for 1 hour under an ordinary pressure in a non-oxidizing atmosphere, thereby sintering and solidifying the preliminarily carbonized carbonaceous fiber and the self-sintering carbonaceous powder. Then, the sintered composite body was further sintered by increasing the temperature to 2000° C. at the rate of 500° C./hour and by maintaining the temperature of 2000° C. for 20 minutes in a non-oxidizing atmosphere. A sliding member of Example 1 was thus obtained.

EXAMPLES 2 through 4

The average particle diameter and the addition amount of $Al_2O_3$ employed as the inorganic powder in Example 1 were varied as listed in Table 1, and the sliding members of Examples 2 through 4 were prepared in the same manner as Example 1.

EXAMPLES 5 and 6

In the sliding members of Examples 5 and 6, $ZrO_2$ fiber was employed as the inorganic fiber instead of $Al_2O_3$ employed as the inorganic powder in Example 1. $ZrO_2$ fiber was 5 $\mu$m in diameter and 0.5 mm in length, and 5 and 10% by weight thereof with respect to the whole amount were added respectively in Examples 5 and 6. Similarly, the sliding members of Examples 5 and 6 were prepared in the same manner as Example 1.

COMPARATIVE EXAMPLE 1

Seventy parts by weight of the self-sintering carbonaceous powder comprising the coal tar mesocarbon microbeads having the average particle diameter of 7 $\mu$m and employed as the binder in Example 1 was only added to 30 parts by weight of the tar-treated preliminarily carbonized carbonaceous fiber working as the reinforcement to make a composite body. Other than this arrangement, namely other than that the composite body is free from the inorganic powder or the inorganic fiber, the sliding member of Comparative Example 1 was prepared in the same manner as Example 1.

TABLE 1

| | Composition (% by weight) | | | |
| --- | --- | --- | --- | --- |
| | Carbonaceous Powder | Carbonaceous Fiber | $Al_2O_3$ Powder Par. Dia./Amount ($\mu$m) | $ZrO_2$ Fiber Dia., Length/Amount ($\mu$m, mm) |
| Ex. 1 | 66.5 | 28.5 | 0.5/5 | None |
| Ex. 2 | 63.0 | 27.0 | 0.5/10 | None |
| Ex. 3 | 66.5 | 28.5 | 4/5 | None |
| Ex. 4 | 63.0 | 27.0 | 4/10 | None |
| Ex. 5 | 66.5 | 28.5 | None | 5, 0.5/5 |
| Ex. 6 | 63.0 | 27.0 | None | 5, 0.5/10 |

Evaluation 1

The sliding members of Examples 1 through 6 and Comparative Example 1 were evaluated on the properties of their friction coefficients ($\mu$) under no lubrication condition. The evaluation was carried out to measure the friction coefficients ($\mu$) of the sliding members of Examples 1 through 6 and Comparative Example 1 with a machine testing laboratory type friction/abrasion tester under the following conditions:

No lubrication;
Speed of 160 rpm (or sliding speed of 2 cm/second);
The sliding area of the test pieces are 2 cm$^2$.
Load increasing at the rate of 10 kgf per 2 minutes; and
Mating member made of high carbon content chromium steel for bearing (SUJ2 as per JIS, hereinafter simply referred to as "SUJ2"). The results of the measurement are shown in FIG. 1.

It is apparent from FIG. 1 that the sliding members of Examples 1 through 6 had higher friction coefficients ($\mu$) under low load than Comparative Example 1 did. This is believed as follows: A mechanical resistance force was exerted between the sliding members and the mating member because the Al$_2$O$_3$ or ZrO$_2$ as the inorganic powder or the inorganic fiber were added in the sliding members of Examples 1 through 6.

Moreover, the sliding members of Examples 1 through 4, in which Al$_2$O$_3$ as the inorganic powder was added, exhibited stable friction coefficients ($\mu$) with respect to the load fluctuation, i.e., the temperature fluctuation. This characteristic is believed to result from the phenomenon that the removal of Al$_2$O$_3$ particles from the carbon matrix portion balances the adhesion of the carbon matrix portion. It may be assumed also from the fact that the sliding members of Examples 5 and 6, in which the inorganic fibers less likely to remove from the carbon matrix portion were added, exhibited the friction coefficients ($\mu$) increasing with the increment of the load.

Hence, the sliding members of Examples 5 and 6, in which ZrO$_2$ as the inorganic fiber was added, exhibited high friction coefficients ($\mu$) of 0.5 or more extremely high values, under the load of 40 kgf or more, because the inorganic fiber is less likely to remove from the carbon matrix portion.

Evaluation 2

The sliding members of Examples 1 through 6 and Comparative Example 1 and the sliding member of Comparative Example 2 made from a conventional carbon-carbon composite material were evaluated on their properties of the friction coefficients ($\mu$) under oil lubrication. The evaluation was carried out to measure the friction coefficients ($\mu$) of the sliding members of Examples 1 through 6 and Comparative Examples 1 and 2 with an LFW friction/abrasion tester (a Falex Ring and Block tester) under the following conditions at the end of the testing time:

Oil lubrication;
Load of 15 kgf;
Speed of 160 rpm;
Testing time of 15 minutes; and
Mating member made of SUJ2.
Block size is 10×15.3×6.3 m/m.
The results of the measurement are shown in FIG. 2.

Figure 2:
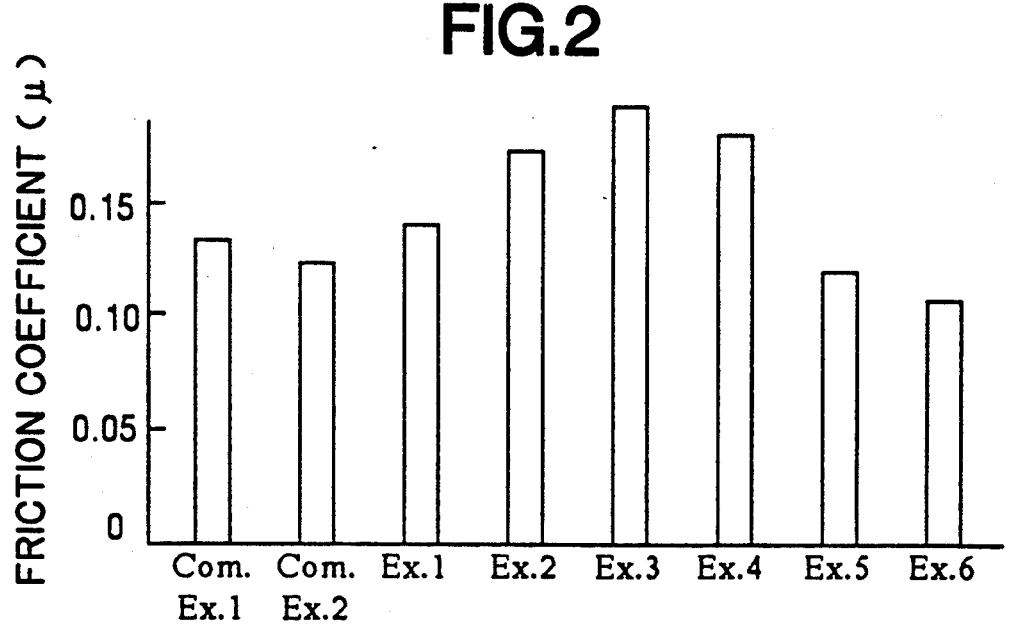
FIG. 2 is a column chart showing the results of the measurement on the friction coefficients ($\mu$ under oil lubrication condition) of the sliding members of Examples 1 through 6, Comparative Example 1 and Comparative Example 2 made from a commercially available carbon-carbon composite material.

As can be seen from FIG. 2, the sliding members of Example 1 through 4, in which Al$_2$O$_3$ as the inorganic powder was added, had friction coefficients ($\mu$) higher than those of the sliding member of Comparative Example 1 and the sliding member of Comparative Example 2 made from the conventional material.

Evaluation 3

The sliding members of Examples 1 through 6 and Comparative Examples 1 and 2 were evaluated on their anti-seizure properties under no lubrication condition, i.e., load at seizure under no lubrication condition. The evaluation was to measure the load when the sliding members of Examples 1 through 6 and Comparative Examples 1 and 2 suffered from the seizure, and carried out with the machine testing laboratory type friction/abrasion tester under the following conditions:

No lubrication;
Speed of 160 rpm;
Load increasing at the rate of 10 kgf per 2 minutes; and
Mating member made of SUJ2.
The results of the measurement are shown in FIG. 3.

Figure 3:
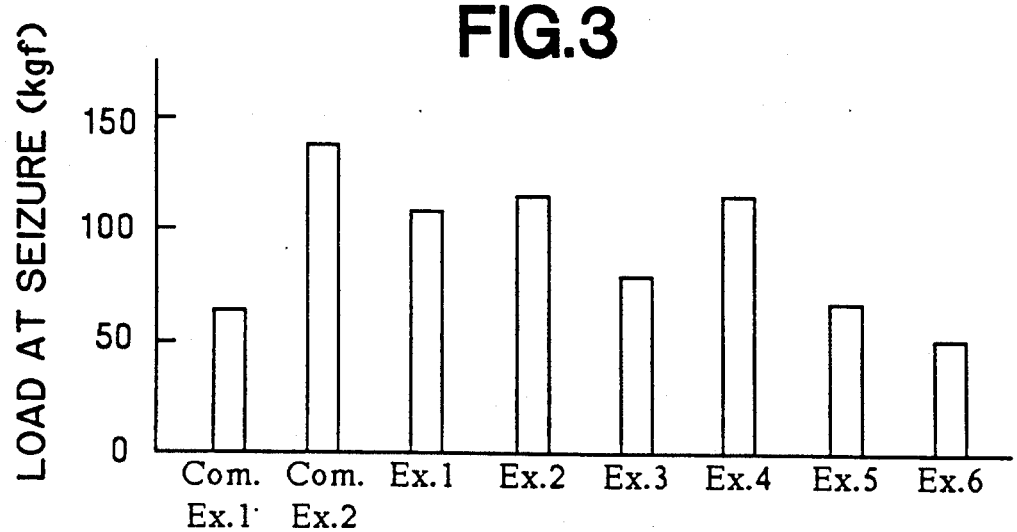
FIG. 3 is a column chart showing the results of the measurement on the loads at seizure (under no lubrication condition) of the sliding members of Examples 1 through 6 and Comparative Examples 1 and 2.

As can be seen from FIG. 3, although the sliding members of Example 1 through 6 had high friction coefficients ($\mu$) under no lubrication condition, they exhibited the load at seizure substantially equal to those of Comparative Examples 1 and 2.

Evaluation 4

Further, the sliding members of Examples 1 through 6 and Comparative Examples 1 and 2 were evaluated on their abrasion resistance under oil lubrication condition. An abrasion test was carried out with the LFW friction/abrasion tester under the following conditions, and their abrasion amounts were measured at the end of the testing time:

Oil lubrication;
Load of 15 kgf;
Speed of 160 rpm;
Testing time of 15 minutes; and
Mating member made of SUJ2.
The results of the measurement are shown in FIG. 4.

Figure 4:
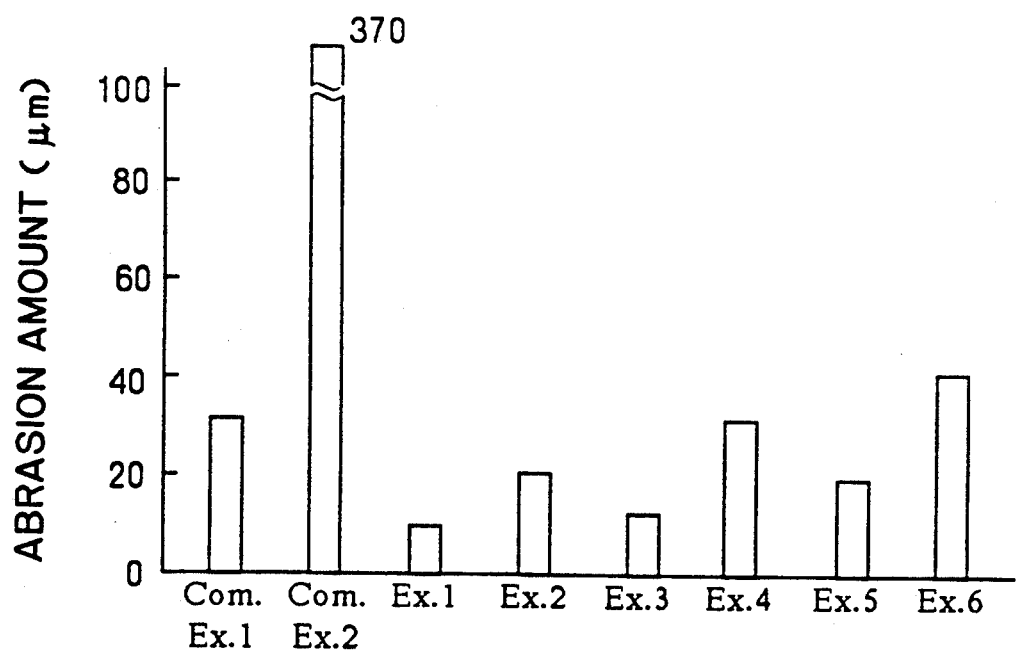
FIG. 4 is a column chart showing the results of the measurement on the abrasion amounts (under oil lubrication condition) of the sliding members of Examples 1 through 6 and Comparative Examples 1 and 2.

As can be seen from FIG. 4, although the sliding members of Example 1 through 6 had high friction coefficients ($\mu$) under oil lubrication condition, they had improved the abrasion resistance far better than the sliding member of Comparative Example 2 made from the conventional carbon-carbon composite material did, and their abrasion resistance were substantially equal to that of the sliding member of Comparative Example 1. This is believed as follows: Since the sliding members of Examples 1 through 6 employed the preliminarily carbonized ones for both of the carbonaceous fiber working as the reinforcement and the carbonaceous powder working as the binder, the carbonaceous fiber and the powder came to have substantially the same physical properties on the strength, the shrinkage rate and the like when they were carbonized, thereby improving the boundary adhesion between the carbonaceous fiber and the carbonaceous powder. In addition, it is also believed as follows: Since the sliding member of Examples 1 through 6 employed the preliminarily carbonized carbonaceous fiber surface-treated with the tar, the wettability of the preliminarily carbonized carbonaceous fiber is further increased, thereby further improving the boundary adhesion between the carbonaceous fiber and the carbonaceous powder.

On the contrary, in the sliding member of Comparative Example 2 made from the conventional carboncarbon composite material, the liquid carbonaceous material used as the binder generates volatile substances during the burning, thereby forming pores. The pores accordingly deteriorated the boundary adhesion between the reinforcement and the binder. Additionally, the sliding member of Comparative Example 2 employed the carbonized or graphitized fiber working as the reinforcement and the preliminarily carbonized liquid carbonaceous material working as the binder. As a result, they had different physical properties on the strength, the shrinkage rate and the like when they were burned, thereby deteriorating the boundary adhesion between the reinforcement and the binder.

EXAMPLE 7

Optically isotropic coal pitch was supplied in a spinning machine, heated at 340° C., extruded through a nozzle of the spinning machine by applying a pressure of an inert gas. The pitch fiber thus obtained was further heated at 350° C. in an oxidizing atmosphere for 2 hours in order to make it infusible. Thus, infusible preliminarily carbonized carbonaceous fiber was prepared, and had the fiber diameter of 15 μm and the fiber length of 0.5 mm.

A mixture was then prepared which included 30 % by weight of the thus obtained infusible preliminarily carbonized carbonaceous fiber as the reinforcement and 70% by weight of the self-sintering carbonaceous powder comprising the coal tar mesocarbon microbeads and working as the binder. The coal tar mesocarbon microbeads had the average particle diameter of 7 μm. Then, 5% by weight of boron carbide compound powders having the average particle diameters of 1.9 μm (produced by Kyoritsu Yogyo Co., LTd.), 5.0 μm (produced by Denki Kagaku Co., Ltd.), 0.5 μm (produced by Denki Kagaku Co., Ltd.) were respectively added to and mixed uniformly with 95% by weight of the mixture, and resulting mixtures were respectively put into a mold and molded into composite bodies having a predetermined shape of a sliding member by applying the molding pressure of 2 ton/cm².

Next, the resulting composite bodies were burned by increasing the temperature from an ordinary temperature to 1000° C. at the rate of 150° C./hour and by maintaining the temperature of 1000° C. for 1 hour under an ordinary pressure in a non-oxidizing atmosphere, thereby sintering and solidifying the preliminarily carbonized carbonaceous fiber and the self-sintering carbonaceous powder. Then, the sintered composite bodies were further sintered by increasing the temperature to 2000° C. at the rate of 500° C./hour and by maintaining the temperature of 2000° C. for 20 minutes in a non-oxidizing atmosphere. The sliding members of Example 7 were thus obtained.

Further, 10% by weight of boron carbide compound powders having the average particle diameters of 1.9 μm (produced by Kyoritsu Yogyo Co., LTd.), 5.0 μm (produced by Denki Kagaku Co., Ltd.), 0.5 μm (produced by Denki Kagaku Co., Ltd.) were respectively added to and mixed uniformly with 90% by weight of the mixture including 30% by weight of the infusible preliminarily carbonized carbonaceous fiber as the reinforcement and 70% by weight of the self-sintering carbonaceous powder comprising the coal tar mesocarbon microbeads having the average particle diameter of 7 μm and working as the binder, and resulting mixtures were molded and sintered in the same manner as abovementioned. The other sliding members of Example 7 were thus obtained.

EXAMPLE 8

In the sliding members of Example 8, boron nitride powders of the average particle diameters of 2.0 μm (produced by Kyoritsu Yogyo Co., Ltd.), 0.6 μm (produced by Shin-etsu Kagaku Co., Ltd.), and 9.3 μm (produced by Shin-etsu Kagaku Co., Ltd.) were employed as the boron compound powder. Other than the addition of the boron nitride powders, the sliding members of Example 8 were prepared in the same manner as Example 7.

EXAMPLE 9

In the sliding members of Example 9, chromium boride powders of the average particle diameters of 1.8 μm (produced by Nihon Shin Kinzoku Co., Ltd.) and 4.4 μm (produced by Nihon Shin Kinzoku Co., Ltd.) were employed as the boron compound powder. Other than the addition of the chromium boride powders, the sliding member of Example 9 were prepared in the same manner as Example 7.

EXAMPLE 10

In the sliding members of Example 10, titanium boride powders of the average particle diameters of 1.4 μm (produced by Nihon Shin Kinzoku Co., Ltd.) and 5.0 μm (produced by Kyoritsu Yogyo Co., Ltd.) were employed as the boron compound powder. Other than the addition of the titanium boride powders, the sliding members of Example 10 were prepared in the same manner as Example 7.

EXAMPLE 11

In the sliding member of Example 11, tantalum boride powder of the average particle diameter of 0.7 μm (produced by Nihon Shin Kinzoku Co., Ltd.) was employed as the boron compound powder. Other than the addition of the tantalum boride powder, the sliding member of Example 11 was prepared in the same manner as Example 7.

EXAMPLE 12

In the sliding members of Example 12, zirconium boride powders of the average particle diameters of 2.0 μm (produced by Nihon Shin Kinzoku Co., Ltd.) and 4.0 μm (produced by Nihon Shin Kinzoku Co., Ltd.) were employed as the boron compound powder. Other than the addition of the zirconium boride powders, the sliding members of Example 12 were prepared in the same manner as Example 7.

COMPARATIVE EXAMPLES 3 THROUGH 5

Seventy parts by weight of the self-sintering carbonaceous powder comprising the coal tar mesocarbon microbeads having the average particle diameter of 7 μm and employed as the binder in Example 7 was only added to 30 parts by weight of the infusible preliminarily carbonized carbonaceous fiber working as the reinforcement to make a composite body. Other than this arrangement, namely other than that the composite body is free from the boron compound powder, the sliding member of Comparative Example 3 was prepared in the same manner as Example 7.

Further, the sliding members of Comparative Examples 4 and 5 were prepared, and they were respectively made from a commercially available conventional carbon fiber reinforced carbon material (produced by Diahitoco Co., Ltd.) and S45C steel material (as per JIS). The commercially available conventional carbon fiber reinforced carbon material was one made by impregnating petroleum pitch into carbonaceous fiber and thereafter sintering them at 2000° C. in an inert gas atmosphere.

Evaluation 5

The sliding members of Examples 1 through 5 and Comparative Examples 3 through 5 were evaluated on their anti-seizure properties under no lubrication condition, and the evaluation was carried out with the machine testing laboratory type friction/abrasion tester in a manner similar to Evaluation 3 under the following conditions:

No lubrication;
Speed of 160 rpm;
Load increasing at the rate of 10 kgf per 2 minutes; and
Mating member made of SUJ2.

The friction coefficients ($\mu$) of the sliding members were also measured at the loads of 100 kgf/cm$^2$ and 150 kgf/cm$^2$. The results of the measurements are shown in Table 2.

It is apparent from Table 2 that the sliding members of Examples 7 through 12 had improved anti-seizure properties when compared with the sliding members of Comparative Examples 3, 4 and 5. Moreover, the values of the friction coefficients ($\mu$) of the sliding members of Examples 7 through 12 were suppressed less than the sliding members of Comparative Examples 3, 4 and 5. This is assumed as follows: The boron compound powders were exposed to a high temperature, and thermally decomposed to produce the liquid phase thereof on the sliding surfaces of the sliding members of Examples 7 through 12 under no lubrication condition.

to evaluate their abrasion resistance. The results of the measurement are shown in FIG. 5.

Figure 5:
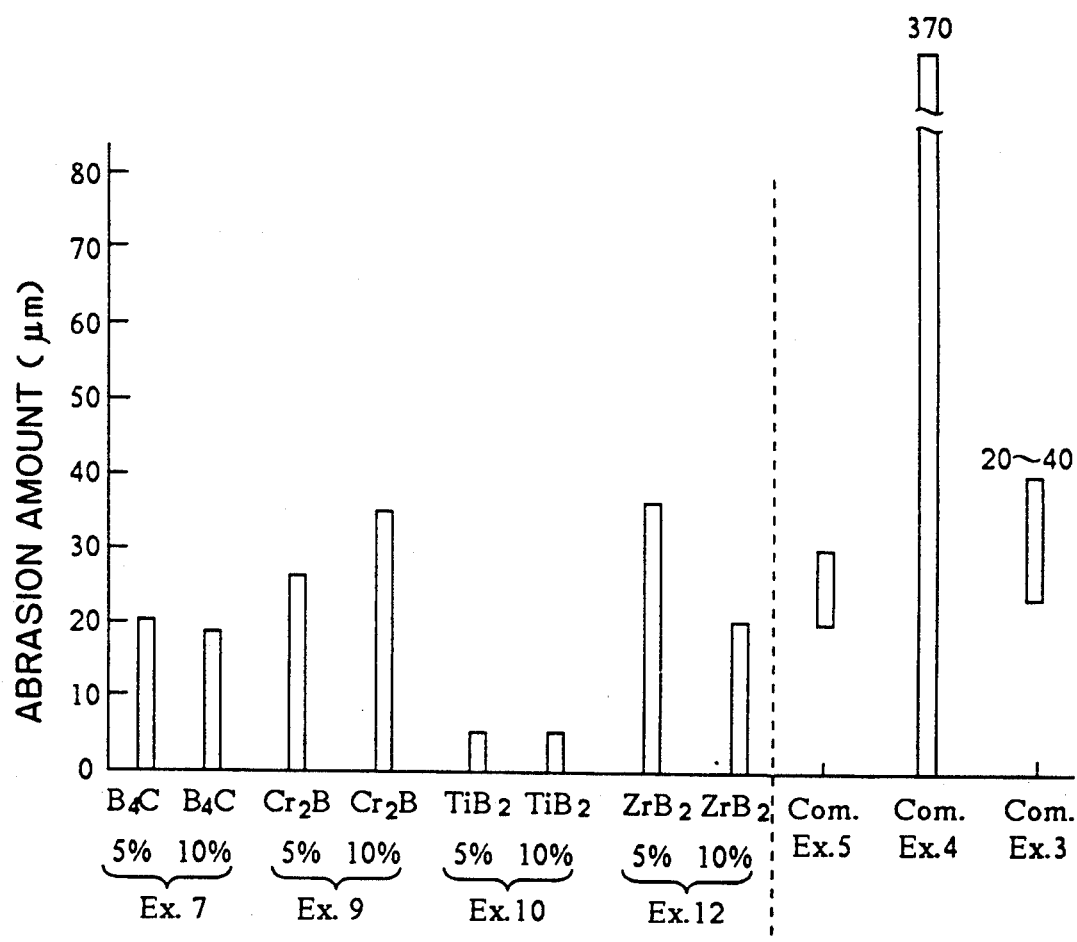
FIG. 5 is a column chart showing the results of the measurement on the abrasion amounts (under oil lubrication condition) of the sliding members of Examples 7, 9, 10 and 12 and Comparative Examples 3 through 5.

As can be seen from FIG. 5, the sliding members of Examples 7, 9, 10 and 12 had remarkably improved abrasion resistance with respect to the sliding member of Comparative Example 4 comprising the commercially available carbon fiber reinforced carbon material. The improvement is believed to result from the same reason that the abrasion resistance of the sliding members of Examples 1 through 6 was improved.

EXAMPLE 13

In the sliding members of Example 13, the following 6 kinds of inorganic boride were employed, other than the addition of the inorganic boride, the sliding members of Example 13 were prepared in the same manner as Example 1. Namely, CoB having the average particle diameter of 4.6 $\mu$m, B$_4$C having the average particle diameter of 1.9 $\mu$m (employed in Example 7), TiB having the average particle diameter of 1.4 $\mu$m (employed in Example 10), ZrB$_2$ having the average particle diameter of 2.0 $\mu$m (employed in Example 12), BN having the average particle diameter of 9.3 $\mu$m (employed in Example 8) and TaB$_2$ having the average particle diameter of 0.7 $\mu$m (employed in Example 11) were employed as the inorganic powder. Besides, the addition amounts of these 6 kinds of inorganic boride were all set at 5% by weight.

EXAMPLE 14

TABLE 2

| | Boron Compound Powder | Par. Dia. ($\mu$m) | Addi. Amount (% by weight) | Load at Seizure (kgf) | Friction Coefficient ($\mu$) | |
|---|---|---|---|---|---|---|
| | | | | | at 200 kgf | at 300 kgf |
| Ex. 7 | Boron Carbide | 1.9 | 5 | 325 | 0.085 | 0.072 |
| | | | 10 | 350 | 0.081 | 0.062 |
| | | 5.0 | 5 | 250 | 0.087 | — |
| | | | 10 | 300 | 0.077 | 0.067 |
| | | 0.5 | 5 | 300 | 0.077 | 0.063 |
| | | | 10 | 475 | 0.075 | 0.060 |
| Ex. 8 | Boron Nitride | 2.0 | 5 | 275 | 0.113 | — |
| | | | 10 | 325 | 0.095 | 0.073 |
| | | 0.6 | 5 | 275 | 0.119 | — |
| | | | 10 | 300 | 0.089 | 0.068 |
| | | 9.3 | 5 | 300 | 0.109 | 0.082 |
| | | | 10 | 325 | 0.096 | 0.074 |
| Ex. 9 | Chromium Boride | 1.8 | 5 | 275 | 0.116 | — |
| | | | 10 | 350 | 0.113 | 0.096 |
| | | 4.4 | 5 | 300 | 0.120 | 0.093 |
| | | | 10 | 250 | 0.134 | 0.115 |
| Ex. 10 | Titanium Boride | 1.4 | 5 | 225 | 0.124 | — |
| | | | 10 | 350 | 0.089 | 0.068 |
| | | 5.0 | 5 | 240 | 0.118 | — |
| | | | 10 | 320 | 0.095 | 0.070 |
| Ex. 11 | Tantalum Boride | 0.7 | 5 | — | — | — |
| | | | 10 | 350 | 0.117 | 0.091 |
| Ex. 12 | Zirconium Boride | 2.0 | 5 | 325 | 0.095 | 0.090 |
| | | | 10 | 400 | 0.090 | 0.066 |
| | | 4.0 | 5 | 275 | 0.151 | — |
| | | | 10 | 250 | 0.106 | — |
| | Com. Ex. 3 | | | 70~90 | 0.2~0.4 (at 50~80 kgf) | |
| | Com. Ex. 4 (Commerically Available Material) | | | 110~150 | 0.2~0.4 (at 100~120 kgf) | |
| | Com. Ex. 5 (S45 steel) | | | 20~40 | | |

Evaluation 6

The sliding members of Examples 7, 9, 10 and 12 and Comparative Examples 3, 4 and 5 were evaluated on their abrasion resistance under oil lubrication condition. An abrasion test similar to Evaluation 4 was carried out In the sliding members of Example 14, the following 3 kinds of inorganic carbide were employed, other than the addition of the inorganic carbide, the sliding members of Example 14 were prepared in the same manner as Example 1. Namely, TiC having the average particle diameter of 1.5 $\mu$m, TaC having the average particle diameter of 1.9 $\mu$m, and ZrC having the average particle diameter of 0.8 μm were employed as the inorganic powder. Besides, the addition amounts of these 3 kinds of inorganic carbide were all set at 5% by weight.

EXAMPLE 15

In the sliding members of Example 15, the following 5 kinds of inorganic nitride were employed, other than the addition of the inorganic nitride, the sliding members of Example 15 were prepared in the same manner as Example 1. Namely, TiN having the average particle diameter of 1.3 μm, TiN having the average particle diameter of 0.5 μm, AlN having the average particle diameter of 1.4 μm, $Cr_2N$ having the average particle diameter of 4 μm, and TaN having the average particle diameter of 3 μm were employed as the inorganic powder. Besides, the addition amounts of these 5 kinds of inorganic nitride were all set at 5% by weight.

EXAMPLE 16

In the sliding members of Example 16, the following 3 kinds of inorganic oxide were employed, other than the addition of the inorganic oxide, the sliding members of Example 16 were prepared in the same manner as Example 1. Namely, $TiO_2$ having the average particle diameter of 3 μm, $Al_2O_3$ having the average particle diameter of 0.5 μm (employed in Examples 1 and 2), and MgO having the average particle diameter of 0.6 μm were employed as the inorganic powder. Besides, the addition amounts of these 3 kinds of inorganic oxide were all set at 5% by weight.

Evaluation 7

Figure 6:
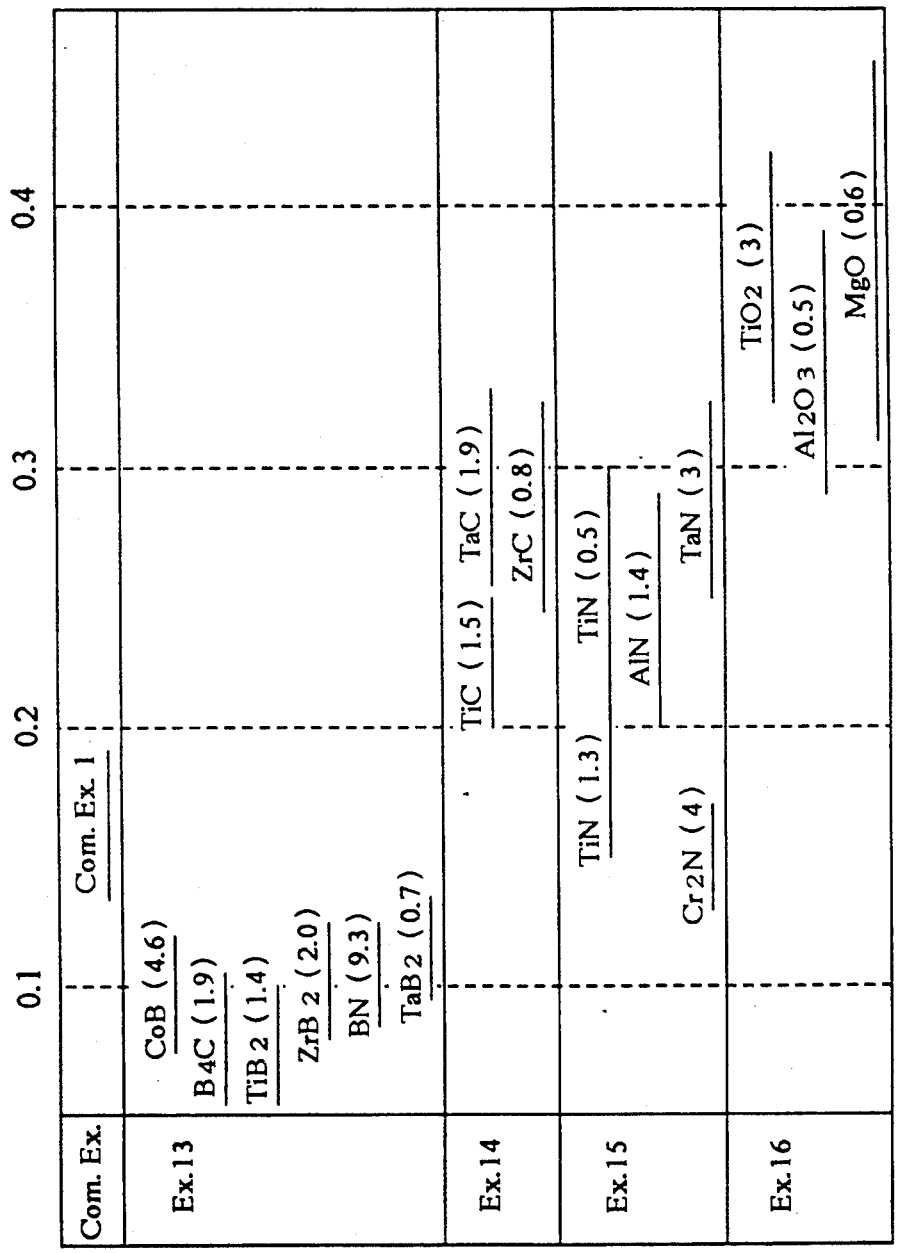
FIG. 6 is a diagram showing the results of the measurement on the friction coefficients ($\mu$ under no lubrication condition) of the sliding members of Examples 13 through 16 and Comparative Example 1.

The 6 sliding members of Example 13, the 3 sliding members of Example 14, the 5 sliding members of Example 15, and the 3 sliding members of Example 16 prepared in the above-mentioned manner were evaluated on their friction coefficeint (μ) properties under no lubrication condition. The evaluation was carried out similarly to Evaluation 2 to measure their friction coefficients (μ), but under no lubrication condition. Here, the load was varied in the range of 25 to 75 kgf/cm². The results of the measurement are shown in FIG. 6. The positions of the horizontal line segments in FIG. 6 specify the friction coefficients (μ).

It is readily understood from FIG. 6 that the values of the friction coefficients (μ) of the sliding members thus obtained can be controlled in the range of about 0.05 to 0.5 by employing various kinds of inorganic powders.

For instance, in the sliding members of Example 13 employing the inorganic boride as the inorganic powder, their friction coefficients (μ) fall in the range of about 0.05 to 0.2. In the sliding members of Example 14 employing the inorganic carbide as the inorganic powder, their friction coefficients (μ) fall in the range of about 0.15 to 0.35. In the sliding members of Example 15 employing the inorganic nitride as the inorganic powder, their friction coefficients (μ) fall in the range of about 0.1 to 0.35. Finally, in the sliding members of Example 16 employing the inorganic oxide as the inorganic powder, their friction coefficients (μ) fall in the range of about 0.25 to 0.5. Consequently, an optimum friction coefficient (μ) can be selected freely as required in accordance with an application of a sliding member.

Moreover, the addition amounts of a total of 17 inorganic powders employed in Examples 13 through 16 were increased to 10% by weight, and another 17 sliding members were prepared anew. The same evaluation test was carried out on the other 17 sliding members. It was found that the other 17 sliding members exhibited friction coefficients (μ) substantially identical to those of the above-mentioned 17 sliding members of Examples 13 through 16.

EXAMPLES 17 THROUGH 22

In the sliding members of Examples 17 through 22, BN was employed as the inorganic powder, other than the addition of BN, the sliding members of Example 17 through 22 were prepared in the same manner as Example 1. When preparing the sliding members of Example 17 and 18, BN having the average particle diameter of 0.6 μm (employed in Example 8) was employed, and the addition amounts were set at 5 and 10% by weight respectively. Further, when preparing the sliding members of Example 19 and 20, BN having the average particle diameter of 2 μm (employed in Example 8) was employed, and the addition amounts were set at 5 and 10% by weight respectively. Moreover, when preparing the sliding members of Example 21 and 22, BN having the average particle diameter of 9.3 μm (employed in Example 8) was employed, and the addition amounts were set at 5 and 10% by weight respectively.

Evaluation 8

The thus prepared 6 sliding members of Examples 17 through 22 in total were evaluated on their friction coefficient (μ) properties under no lubrication condition by carrying out an evaluation test identical to Evaluation 1. The results are shown in FIG. 7.

Figure 7:
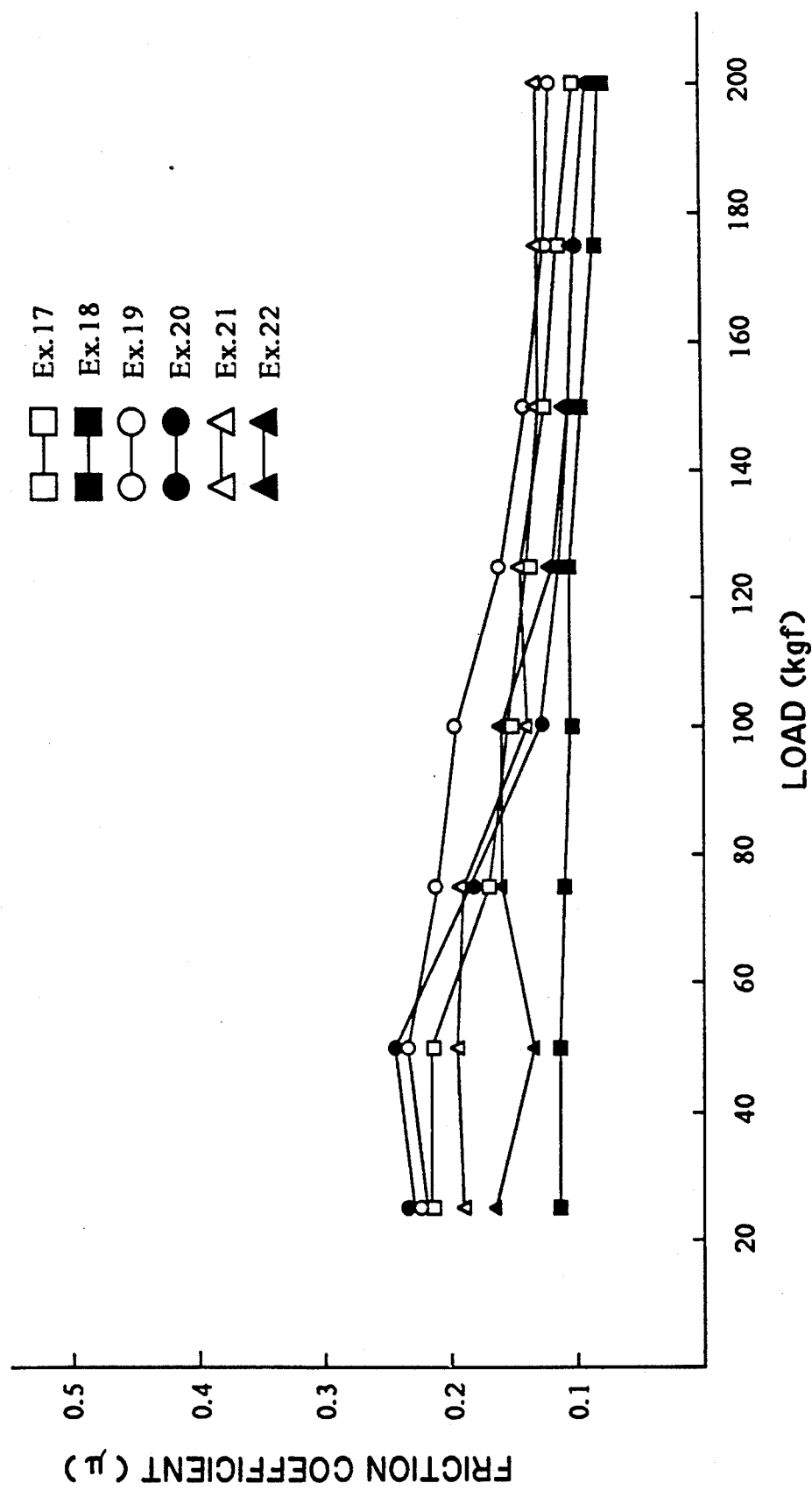
FIG. 7 is a line chart showing the results of the measurement on the friction coefficients ($\mu$ under no lubrication condition) of the sliding members of Examples 17 through 22.

It is apparent from FIG. 7 that the 6 sliding members of Examples 17 through 22 exhibited stable friction coefficients (μ) over a wide range of loads. It is believed that the added inorganic powder exerted a mechanical resistance force between the sliding member and the mating member in a manner similar to those of the above-mentioned sliding members of Examples 1 through 4.

EXAMPLES 23 THROUGH 30

Eight sliding members of Examples 23 through 30 were prepared in the same manner as Example 1 except that $Al_2O_3$ was employed as the inorganic powder in the sliding members of Examples 23 through 26 and that $TiB_2$ was employed as the inorganic powder in the sliding members of Example 27 through 30. When preparing the sliding members of Examples 23 and 24 (identical to Examples 1 and 2), $Al_2O_3$ having the average particle diameter of 0.5 μm was employed, and the addition amounts were set at 5 and 10% by weight respectively, and when preparing the sliding members of Examples 25 and 26 (identical to Examples 3 and 4), $Al_2O_3$ having the average particle diameter of 4 μm was employed, and the addition amounts were set at 5 and 10% by weight respectively. On the other hand, when preparing the sliding members of Examples 27 and 28, TiB having the average particle diameter of 1.4 μm (employed in Example 10) was employed, and the addition amounts were set at 5 and 10% by weight respectively, and when preparing the sliding members of Examples 29 and 30, $TiB_2$ having the average particle diameter of 4 μm was employed, and the addition amounts were set at 5 and 10% by weight respectively.

Evaluation 9

The thus prepared 8 sliding members of Examples 23 through 30 in total were evaluated on their friction coefficient (μ) properties under no lubrication condition by carrying out an evaluation test identical to Evaluation 1. The results are shown in FIG. 8.

Figure 8:
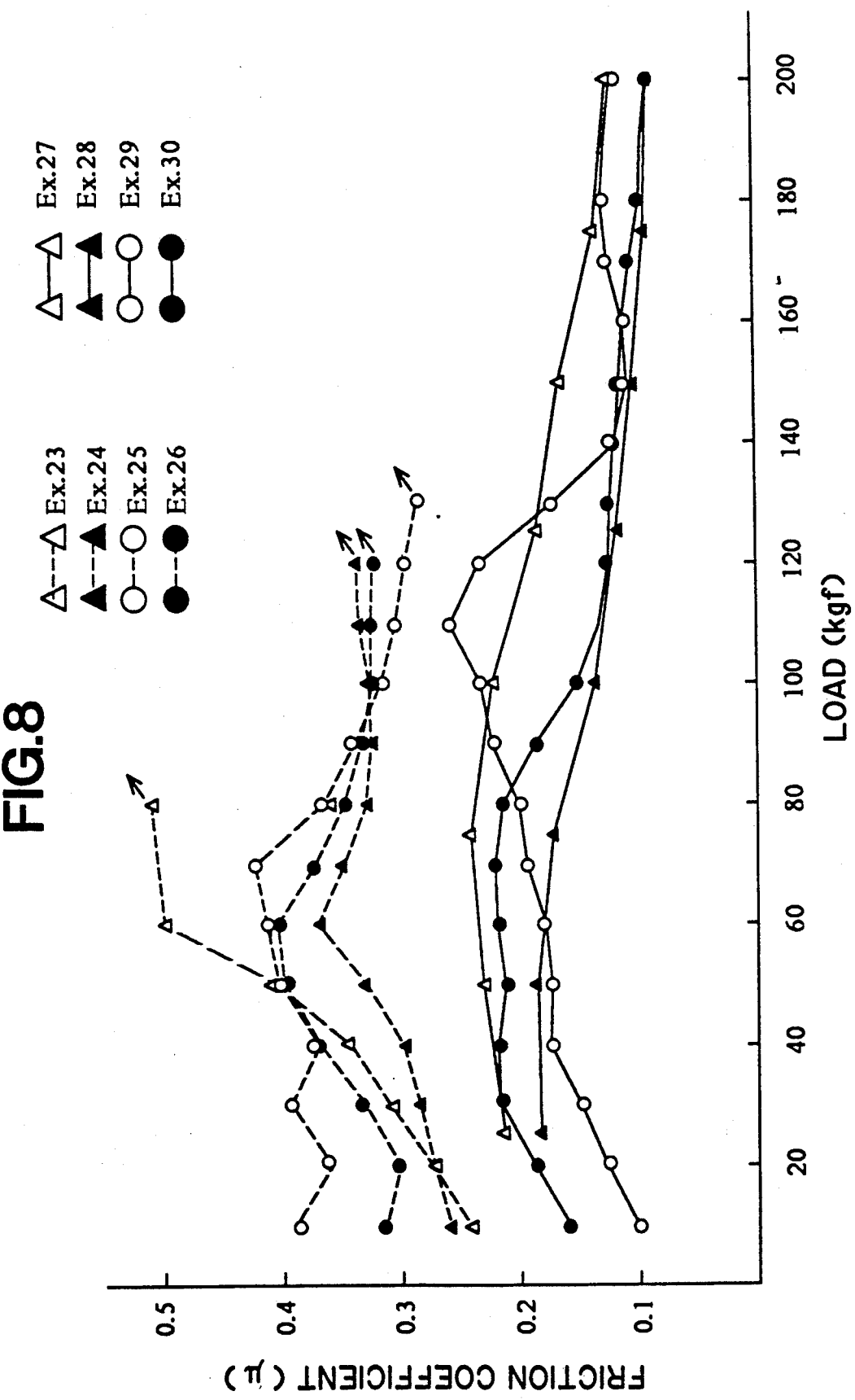
FIG. 8 is a line chart showing the results of the measurement on the friction coefficients ($\mu$ under no lubrication condition) of the sliding members of Examples 23 through 30.

It is apparent from FIG. 8 that the 4 sliding members of Examples 23 through 26 had the friction coefficients ($\mu$) having the tendency to increase under the high load of more than 140 kgf. However, except the sliding member of Example 25, the sliding members of Examples 23, 24 and 26 exhibited relatively stable friction coefficients ($\mu$) in the load range of 10 to 60 kgf/cm$^2$. On the other hand, the 4 sliding members of Examples 27 through 30 which employed TiB$_2$ as the inorganic powder were found to exhibit stable friction coefficients ($\mu$) over a wide range of loads. These properties on the friction coefficients ($\mu$) are similar to those of the sliding members of Examples 1 through 4, and it is also believed that a mechanical resistance force was exerted between the added inorganic powder and the mating member.

EXAMPLE 31

In the sliding members of Example 31, the following 8 kinds of inorganic boride were employed, other than the addition of the inorganic boride, the 8 sliding members of Example 31 were prepared in the same manner as Example 1. Namely, TiB$_2$ having the average particle diameter of 4 $\mu$m (employed in Examples 29 and 30), TiB$_2$ having the average particle diameter of 1.4 $\mu$m (employed in Example 10), ZrB$_2$ having the average particle diameter of 4 $\mu$m (employed in Example 12), ZrB$_2$ having the average particle diameter of 2 $\mu$m (employed in Example 12), NiB$_2$ having the average particle diameter of 4.3 $\mu$m, B$_4$C having the average particle diameter of 1.9 $\mu$m (employed in Example 7), B$_4$C having the average particle diameter of 5 $\mu$m (employed in Example 7), and B$_4$C having the average particle diameter of 0.5 $\mu$m (employed in Example 7) were employed as the inorganic powder. Besides, the addition amounts of these 8 kinds of inorganic boride were all set at 5% by weight.

EXAMPLE 32

In the sliding members of Example 32, the following 4 kinds of inorganic carbide were employed, other than the addition of the inorganic carbide, the 4 sliding members of Example 32 were prepared in the same manner as Example 1. Namely, TiC having the average particle diameter of 0.7 $\mu$m, TiC having the average particle diameter of 1.4 $\mu$m, TaC having the average particle diameter of 1.9 $\mu$m (employed in Example 14), and ZrC having the average particle diameter of 0.8 $\mu$m (employed in Example 14) were employed as the inorganic powder. Besides, the addition amounts of these 4 kinds of inorganic carbide were all set at 5% by weight.

EXAMPLE 33

In the sliding members of Example 33, the following 7 kinds of inorganic nitride were employed, other than the addition of the inorganic nitride, the 7 sliding members of Example 33 were prepared in the same manner as Example 1. Namely, TiN having the average particle diameter of 0.5 $\mu$m (employed in Example 15), TiN having the average particle diameter of 1.3 $\mu$m (employed in Example 15), TaN having the average particle diameter of 3.1 $\mu$m, ZrN having the average particle diameter of 1.4 $\mu$m, BN having the average diameter of 4.3 $\mu$m, AlN having the average particle diameter of 2.6 $\mu$m, and AlN having the average particle diameter of 1.4 $\mu$m (employed in Example 15) were employed as the inorganic powder. Besides, the addition amounts of these 7 kinds of inorganic nitride were all set at 5% by weight.

EXAMPLE 34

In the sliding members of Example 34, the following 6 kinds of inorganic oxide were employed, other than the addition of the inorganic oxide, the 6 sliding members of Example 34 were prepared in the same manner as Example 1. Namely, Al$_2$O$_3$ having the average particle diameter of 0.5 $\mu$m (employed in Examples 1 and 2), Al$_2$O$_3$ having the average particle diameter of 4 $\mu$m (employed in Examples 3 and 4), TiO$_2$ having the average particle diameter of 3 $\mu$m (employed in Example 16), TiO$_2$ having the average diameter of 3.4 $\mu$m, ZrO$_2$ having the average diameter of 1 $\mu$m, and MgO having the average particle diameter of 0.3 $\mu$m were employed as the inorganic powder. Besides, the addition amounts of these 6 kinds of inorganic oxide were all set at 5% by weight.

Evaluation 10

Figure 9:
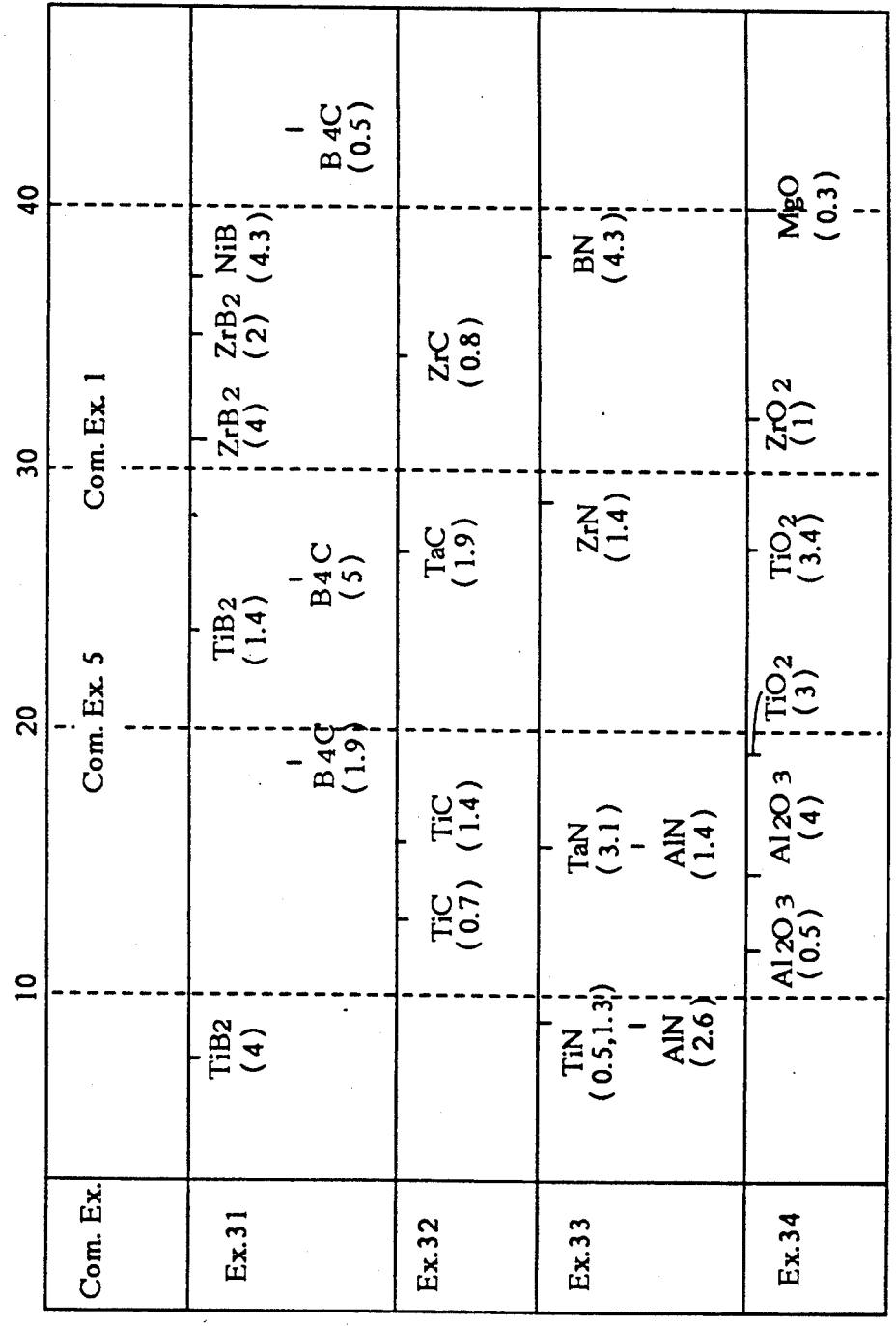
FIG. 9 is a diagram showing the results of the measurement on the abrasion amounts (under oil lubrication) of the sliding members of Examples 31 through 34 and Comparative Examples 1 and 5.

The 8 sliding members of Example 31, the 4 sliding members of Example 32, the 7 sliding members of Example 33, and the 6 sliding members of Example 34 prepared in the above-mentioned manner were evaluated on their abrasion resistance under oil lubrication condition. The evaluation was carried out similarly to Evaluation 4. The results of the measurement are shown in FIG. 9. The positions of the vertical short line segments specify the abrasion amounts.

It is readily understood from FIG. 9 that the 25 sliding members of Examples 31 through 34 in total exhibited the abrasion amounts equivalent to or as less as approximately one-third of the abrasion amount exhibited by the sliding member of Comparative Example 1. As earlier mentioned, the sliding member of Comparative Example 1 was prepared for evaluating the sliding members of Examples 1 through 6, composed of the composite body including 30 parts by weight of the tartreated infusible preliminarily carbonized carbonaceous fiber as the reinforcement and 70 parts by weight of the self-sintering carbonaceous powder only added thereto, and prepared by sintering the composite body free from the addition of the inorganic powder. The self-sintering carbonaceous powder comprised the coal tar mesocarbon microbeads of the average particle diameter of 7 $\mu$m and worked as the binder.

Moreover, according to the result of the same evaluation test done on the sliding member of Comparative Example 2 made from the commercially available conventional carbon-carbon composite material, the sliding member of Comparative Example 2 exhibited the abrasion amount of 370 $\mu$m. Accordingly, all of the 25 sliding members of Examples 31 through 34 were exhibited the abrasion amounts as less as approximately one-tenth to one-fortieth of the abrasion amount exhibited by the sliding member of Comparative Example 2. Thus, the abrasion resistance of the sliding members of Examples 31 through 34 was found to be remarkably improved.

EXAMPLES 35 AND 36

The sliding members of Examples 35 and 36 were prepared in the same manner as Example 1 except that TiB$_2$ was employed as the inorganic powder in the sliding member of Examples 35 and that B$_4$C was employed as the inorganic powder in the sliding member of Example 36. When preparing the sliding member of Example 35, TiB$_2$ having the average particle diameter of 1.0 μm was employed, the addition amount was varied variously, and the measurements on the density, the abrasion amount and the bending strength were carried out as described in the following Evaluation 11. Likewise, when preparing the sliding member of Example 36, B$_4$C having the average particle diameter of 0.5 μm (employed in Example 7) was employed, the addition amount was varied variously, and the measurements on the density, the abrasion amount and the bending strength were carried out similarly to the sliding member of Example 35 in the following Evaluation 11.

Evaluation 11

Figure 10:
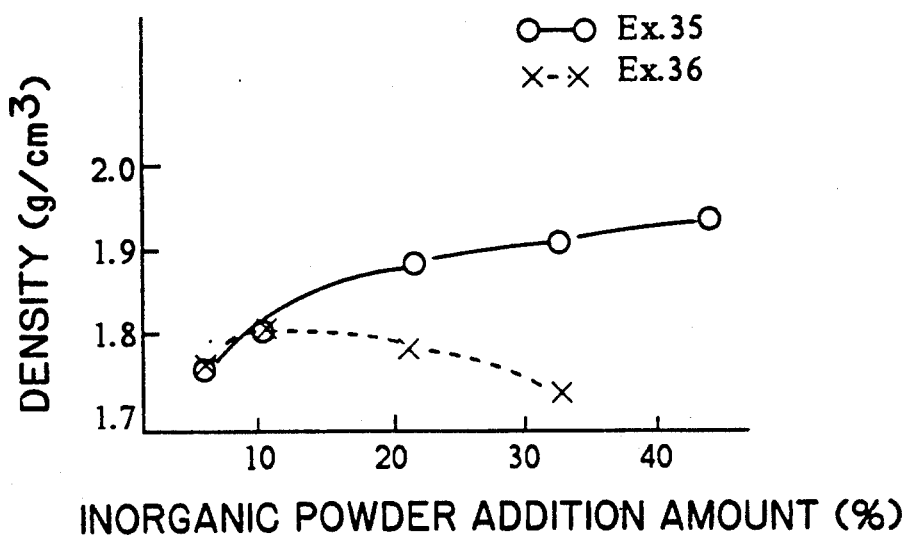
FIG. 10 is a line chart showing the variations of the densities of the sliding members of Examples 35 and 36 with respect to the variations of the inorganic addition amounts thereof.

The results of the measurements on the densities of the Examples 35 and 36 are illustrated in FIG. 10. According to FIG. 10, in the sliding member of Example 36 employing B$_4$C as the inorganic powder, the density thereof exhibited the maximum value when the addition amount of B$_4$C was approximately 10% by weight. On the contrary, in the sliding member of Example 35 employing TiB$_2$ as the inorganic powder, the density thereof had a tendency to increase as the TiB addition amount increased.

Figure 11:
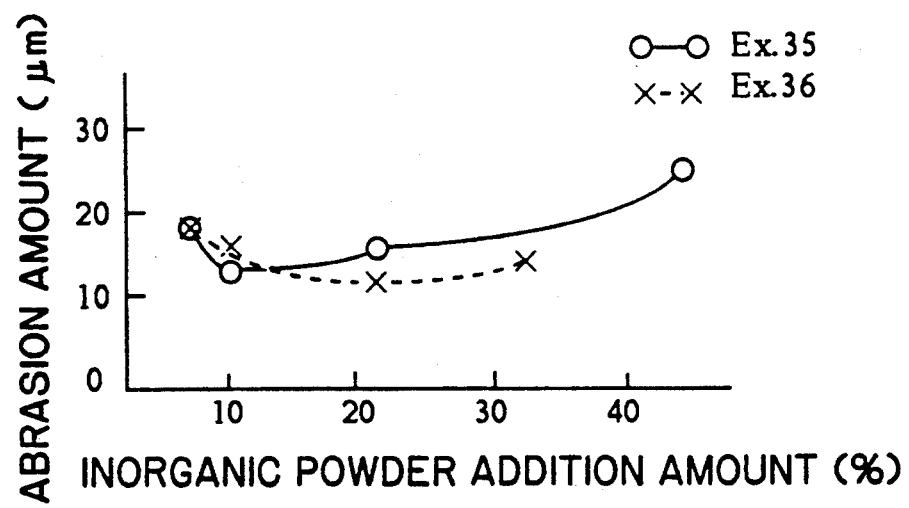
FIG. 11 is a line chart showing the variations of the abrasion amounts of the sliding members of Examples 35 and 36 with respect to the variations of the inorganic addition amounts thereof.

The sliding members of Examples 35 and 36 were evaluated on their abrasion resistance, i.e., their abrasion amounts, by carrying out an abrasion test similar to Evaluation 4. The results of the evaluation are illustrated in FIG. 11. As can be seen from FIG. 11, both of the sliding members of Examples 35 and 36 had a tendency to exhibit the abrasion amounts of the minimum values when the inorganic powder addition amounts reached predetermined values.

Figure 12:
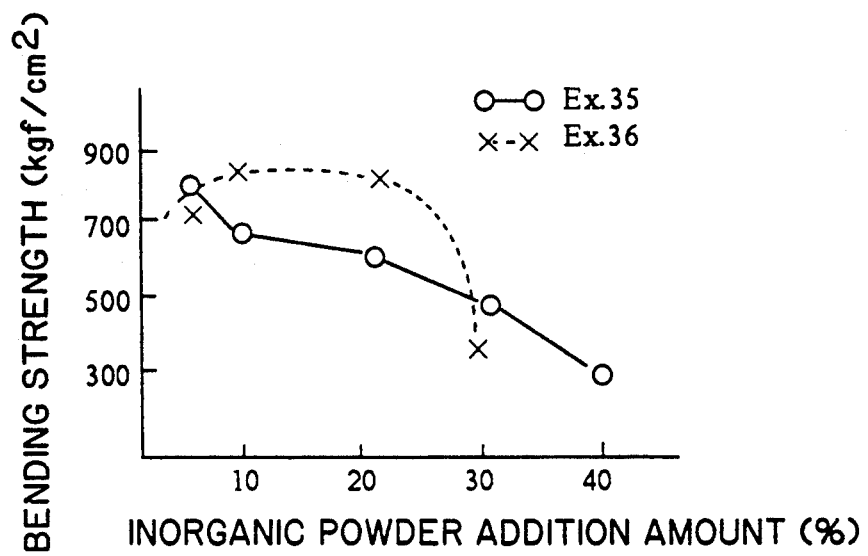
FIG. 12 is a line chart showing the variations of the bending strength of the sliding members of Examples 35 and 36 with respect to the variations of the inorganic addition amounts thereof.
Figure 13:
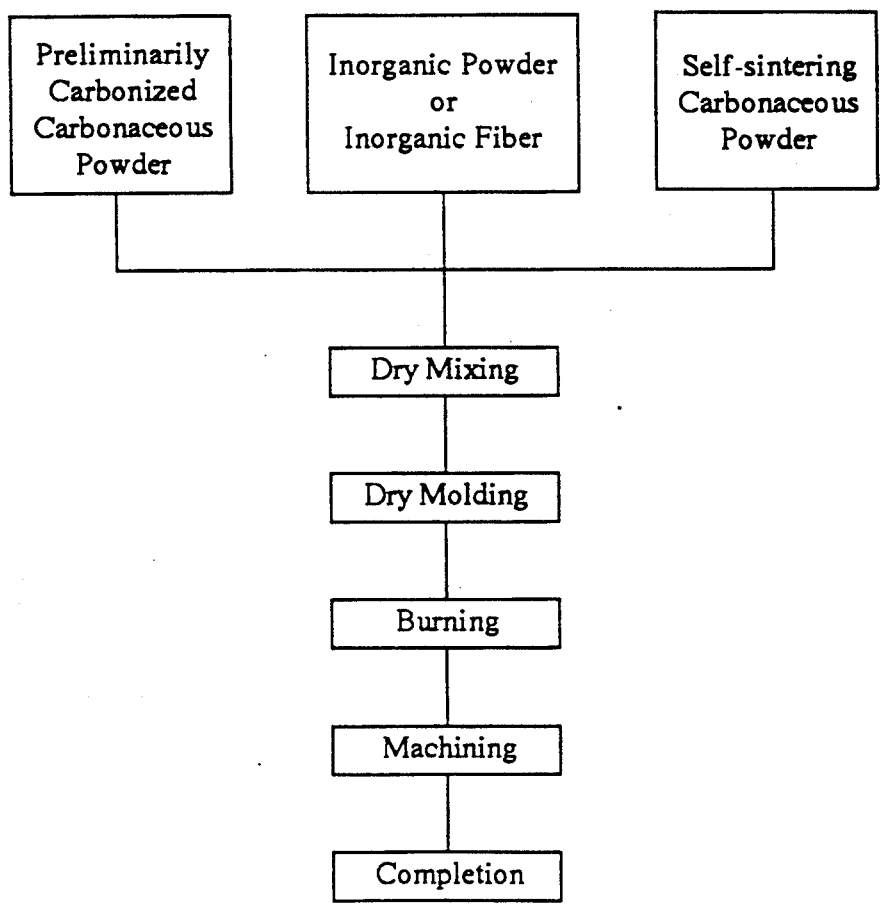
FIG. 13 is a block diagram showing a manufacturing process of a sliding member of the present invention.

The sliding members of Examples 35 and 36 were molded into test pieces having the size of 10 mm in length×30 mm in width×10 mm in thickness. Then, the cross head speed was set at 1 mm/min., and the loads at the time of the breakage of the test pieces were measured in order to evaluate the bending strength of the sliding members of Examples 35 and 36. The results of the measurement are illustrated in FIG. 12. As can be seen from FIG. 12, the bending strength of the sliding members of Examples 35 and 36 decreased as the inorganic powder addition amounts increased. Accordingly, it is necessary to select an appropriate inorganic powder addition amount and give a sliding member optimum bending strength depending on an application of a sliding member.

EXAMPLE 37

In the sliding members of Example 37, the following 2 kinds of inorganic aluminum compound were employed, other than the addition of the inorganic aluminum compound, the sliding members of Example 37 were prepared in the same manner as Example 1. Namely, Al$_2$O$_3$ and AlN were employed as the inorganic powder. As for Al$_2$O$_3$, one having the average particle diameter of 0.5 μm (employed in Examples 1 and 2) and the other having the average particle diameter of 4.0 μm (employed in Examples 3 and 4) were prepared, and the addition amounts of the Al$_2$O$_3$ powders having these 2 kinds of average particle diameters were set at 5 as well as 10% by weight. Similarly, as for AlN, one having the average particle diameter of 1.4 μm (employed in Example 15) and the other having the average particle diameter of 2.6 μm (employed in Example 33) were prepared, and the addition amounts of the AlN powders having these 2 kinds of average particle diameters were set at 5 as well as 10% by weight.

EXAMPLE 38

In the sliding members of Example 38, the following 2 kinds of inorganic boron compound were employed, other than the addition of the inorganic boron compound, the sliding members of Example 38 were prepared in the same manner as Example 1. Namely, B$_4$C and BN were employed as the inorganic powder. As for B$_4$C, one having the average particle diameter of 0.5 μm, the other having the average particle diameter of 1.9 μm and still another having the average particle diameter of 5.0 μm were prepared (all employed in Example 7), and the addition amounts of the B$_4$C powders having these 3 kinds of average particle diameters were set at 5 as well as 10% by weight. Similarly, as for BN, one having the average particle diameter of 0.6 μm, the other having the average particle diameter of 2.0 μm and still another having the average particle diameter of 9.3 μm were prepared (all employed in Example 8), and the addition amounts of the BN powders having these 3 kinds of average particle diameters were set at 5 as well as 10% by weight.

EXAMPLE 39

In the sliding member of Example 39, the inorganic cobalt compound (CoB) was employed, other than the addition of the inorganic cobalt compound, the sliding member of Example 39 was prepared in the same manner as Example 1. Namely, CoB having the average particle diameter of 4.6 μm (employed in Example 13) was prepared, and the addition amount of the CoB powder was set at 5 as well as 10% by weight.

EXAMPLE 40

In the sliding members of Example 40, the following 2 kinds of inorganic chromium compound were employed, other than the addition of the inorganic chromium compound, the sliding members of Example 40 were prepared in the same manner as Example 1. Namely, Cr$_2$N and Cr$_2$B were employed as the inorganic powder. Cr$_2$N having the average particle diameter of 3.9 μm was prepared, and the addition amount of the Cr$_2$N powder was set at 5 as well as 10% by weight. As for Cr$_2$B, one having the average particle diameter of 1.8 μm and the other having the average particle diameter of 4.4 μm were prepared (all employed in Example 9), and the addition amounts of the Cr$_2$B powders having these 2 kinds of average particle diameters were set at 5 as well as 10% by weight.

EXAMPLE 41

In the sliding members of Example 41, the following 2 kinds of inorganic magnesium compound were employed, other than the addition of the inorganic magnesium compound, the sliding members of Example 41 were prepared in the same manner as Example 1. Namely, MgB$_2$ and MgO were employed as the inorganic powder. MgB having the average particle diameter of 0.5 μm was prepared, and the addition amount of the MgB$_2$ powder was set at 5 as well as 10% by weight. As for MgO, one having the average particle diameter of 0.2 μm, the other having the average particle diameter of 0.35 μm and still another having the average particle diameter of 0.6 μm (employed in Example 16) were prepared, and the addition amounts of the MgO powders having these 3 kinds of average particle diameters were set at 5 as well as 10% by weight.

EXAMPLE 42

In the sliding member of Example 42, the inorganic nickel compound (NiB) was employed, other than the addition of the inorganic nickel compound, the sliding member of Example 42 was prepared in the same manner as Example 1. Namely, NiB having the average particle diameter of 4.3 μm (employed in Example 31) was prepared, and the addition amount of the NiB powder was set at 5 as well as 10% by weight.

EXAMPLE 43

In the sliding members of Example 43, the following 3 kinds of inorganic tantalum compound were employed, other than the addition of the inorganic tantalum compound, the sliding members of Example 43 were prepared in the same manner as Example 1. Namely, TaC, TaN and $TaB_2$ were employed as the inorganic powder. TaC having the average particle diameter of 1.9 μm (employed in Example 14) was prepared, and the addition amount of the TaC powder was set at 5 as well as 10% by weight. Similarly, TaN having the average particle diameter of 3.1 μm (employed in Example 33) was prepared, and the addition amount of the TaN powder was set at 5 as well as 10% by weight. Likewise, $TaB_2$ powder having the average particle diameter of 0.7 μm (employed in Example 11) was prepared, and the addition amount of the $TaB_2$ powder was set at 5 as well as 10% by weight.

EXAMPLE 44

In the sliding members of Example 44, the following 4 kinds of inorganic titanium compound were employed, other than the addition of the inorganic titanium compound, the sliding members of Example 44 were prepared in the same manner as Example 1. Namely, $TiO_2$, TiC, TiN and $TiB_2$ were employed as the inorganic powder. As for $TiO_2$, one having the average particle diameter of 0.4 μm and the other having the average particle diameter of 3.3 μm were prepared, and the addition amounts of the $TiO_2$ powders having these 2 kinds of average particle diameters were set at 5 as well as 10% by weight. Similarly, as for TiC, one having the average particle diameter of 0.7 μm and the other having the average particle diameter of 1.4 μm were prepared (all employed in Example 32), and the addition amounts of the TiC powders having these 2 kinds of average particle diameters were set at 5 as well as 10% by weight. Likewise, as for TiN, one having the average particle diameter of 0.5 μm and the other having the average particle diameter of 1.3 μm were prepared (all employed in Example 15), and the addition amounts of the TiN powders having these 2 kinds of average particle diameters were set at 5 as well as 10% by weight. Finally, as for $TiB_2$, the first one having the average particle diameter of 1.0 μm, the second one having the average particle diameter of 1.4 μm (employed in Example 10), the third one having the average particle diameter of 2.3 μm and the fourth one having the average particle diameter of 4.0 μm (employed in Examples 29 and 30) were prepared, and the addition amounts of the $TiB_2$ powders having these 4 kinds of average particle diameters were set at 5 as well as 10% by weight.

EXAMPLE 45

In the sliding members of Example 45, the following 4 kinds of inorganic zirconium compound were employed, other than the addition of the inorganic zirconium compound, the sliding members of Example 45 were prepared in the same manner as Example 1. Namely, $ZrO_2$, ZrC, ZrN and $ZrB_2$ were employed as the inorganic powder. $ZrO_2$ having the average particle diameter of 1.0 μm (employed in Example 34) was prepared, and the addition amount of the ZrO powder was set at 5 as well as 10% by weight. Similarly, ZrC having the average particle diameter of 0.8 μm (employed in Example 14) was prepared, and the addition amount of the ZrC powder was set at 5 as well as 10% by weight. Likewise, ZrN having the average particle diameter of 1.4 μm (employed in Example 33) was prepared, and the addition amount of the ZrN powder was set at 5 as well as 10% by weight. Finally, as for $ZrB_2$, one having the average particle diameter of 2.0 μm and the other having the average particle diameter of 4.0 μm were prepared (all employed in Example 12), and the addition amounts of the $ZrB_2$ powders having these 2 kinds of average particle diameters were set at 5 as well as 10% by weight.

EXAMPLE 46

Two kinds of sliding members of Example 46 were prepared in the same manner as Example 1 except that $Al_2O_3$ fiber and $ZrO_2$ fiber were employed as the inorganic fiber in the sliding members of Example 46. $Al_2O_3$ fiber having the fiber length of 0.5 mm and the fiber diameter of 5 μm was prepared, and the addition amount of the $Al_2O_3$ fiber was set at 5 as well as 10% by weight. Likewise, $ZrO_2$ fiber having the fiber length of 0.5 mm and the fiber diameter of 5 μm (employed in Examples 5 and 6) was prepared, and the addition amount of the $ZrO_2$ fiber was set at 5 as well as 10% by weight.

Evaluation 12

First, the densities of the sliding members of Examples 37 through 46 thus prepared were measured. Then, the loads at seizure thereof were measured under no lubrication condition by carrying a test similar to Evaluation 3. Further, the abrasion resistance, i.e., the abrasion amounts thereof, was measured under oil lubrication condition by carrying out a test similar to Evaluation 4. Finally, the bending strength thereof was measured by carrying out a test similar to the bending strength test of Evaluation 11. The results of these measurements are summarized in Table 3.

TABLE 3

| | | Par. Dia. (μm) | Addi. Amount (% by weight) | Density (g/cm³) | Abrasion Amount (μm) | Bending Strength (kgf/cm²) | Load at Seizure (kgf) |
|---|---|---|---|---|---|---|---|
| Ex. 37 | $Al_2O_3$ | 0.5 | 5 | 1.74–1.76 | 11 | 829 | 110 |
| | | | 10 | 1.70–1.73 | 22 | 473 | 115 |
| | | 4.0 | 5 | 1.77–1.80 | 15 | 912 | 85 |
| | | | 10 | 1.81–1.82 | 26 | 708 | 115 |
| | AlN | 1.4 | 5 | 1.82–1.82 | 15 | 703 | 500 |

TABLE 3-continued

| | | Par. Dia. (μm) | Addi. Amount (% by weight) | Density (g/cm³) | Abrasion Amount (μm) | Bending Strength (kgf/cm²) | Load at Seizure (kgf) |
|---|---|---|---|---|---|---|---|
| | | | 10 | 1.82–1.83 | 16 | 600 | 150 |
| | | 2.6 | 5 | 1.82–1.82 | 9 | 728 | 125 |
| | | | 10 | 1.82–1.83 | 13 | 741 | 150 |
| Ex. 38 | B₄C | 1.9 | 5 | 1.85–1.86 | 20 | 897 | 325 |
| | | | 10 | 1.85–1.86 | 19 | 975 | 350 |
| | | 5.0 | 5 | 1.84–1.85 | 24 | 916 | 250 |
| | | | 10 | 1.85–1.86 | 20 | 853 | 325 |
| | | 0.5 | 5 | 1.83–1.83 | 44 | 687 | 300 |
| | | | 10 | 1.81–1.81 | 25 | 597 | 475 |
| | BN | 0.6 | 5 | 1.73–1.73 | 100 | 331 | 275 |
| | | | 10 | 1.68–1.69 | 25 | 270 | 425 |
| | | 9.3 | 5 | 1.80–1.81 | 39 | 600 | 300 |
| | | | 10 | 1.79–1.80 | 38 | 640 | 400 |
| | | 2.0 | 5 | 1.81–1.82 | 39 | 668 | 275 |
| | | | 10 | 1.78–1.78 | 39 | 608 | 325 |
| Ex. 39 | CoB | 4.6 | 5 | 1.85–1.86 | 70 | 596 | 125 |
| | | | 10 | 1.92–1.93 | 67 | 756 | 500 |
| Ex. 40 | Cr₂N | 3.9 | 5 | 1.81–1.81 | 65 | 495 | 225 |
| | | | 10 | 1.83–1.83 | 36 | 368 | 225 |
| | | 1.8 | 5 | 1.82–1.82 | 51 | 529 | 275 |
| | | | 10 | 1.88–1.89 | 50 | 680 | 350 |
| | Cr₂B | 4.4 | 5 | 1.86–1.87 | 49 | 600 | 300 |
| | | | 10 | 1.92–1.93 | 40 | 780 | 300 |
| Ex. 41 | MgB₂ | 0.5 | 5 | 1.77–1.78 | — | 1036 | — |
| | MgO | 0.2 | 5 | 1.70–1.71 | 40 | 529 | 125 |
| | | | 10 | 1.59–1.60 | 54 | 448 | 125 |
| | | 0.6 | 5 | 1.70–1.71 | 41 | 529 | 125 |
| | | | 10 | 1.59–1.60 | 52 | 549 | 100 |
| | | 0.35 | 5 | 1.68–1.68 | 56 | 461 | 100 |
| | | | 10 | 1.54–1.55 | 142 | 267 | 100 |
| Ex. 42 | NiB | 4.3 | 5 | 1.86–1.87 | 37 | 556 | 100 |
| | | | 10 | 1.92–1.93 | 89 | 622 | 150 |
| Ex. 43 | TaC | 1.9 | 5 | 1.90–1.91 | 27 | 936 | 100 |
| | | | 10 | 1.99–1.99 | 20 | 737 | 100 |
| | TaN | 3.1 | 5 | 1.88–1.89 | 15 | 847 | 125 |
| | | | 10 | 1.97–1.98 | 18 | 712 | 100 |
| | TaB₂ | 0.7 | 5 | 1.86–1.87 | 54 | 697 | 150 |
| | | | 10 | 1.94–1.95 | 49 | 623 | 350 |
| Ex. 44 | TiO₂ | 0.4 | 5 | 1.78–1.79 | 27 | 647 | 75 |
| | | | 10 | 1.75–1.76 | 59 | 364 | 100 |
| | | 3.3 | 5 | 1.78–1.79 | 19 | 572 | 100 |
| | | | 10 | 1.78–1.78 | 17 | 394 | 125 |
| | TiC | 0.7 | 5 | 1.84–1.85 | 14 | 861 | 75 |
| | | | 10 | 1.89–1.90 | 15 | 772 | 100 |
| | | 1.4 | 5 | 1.86–1.86 | 15 | 878 | 150 |
| | | | 10 | 1.91–1.92 | 14 | 735 | 150 |
| | TiN | 0.5 | 5 | 1.84–1.84 | 10 | 641 | 150 |
| | | | 10 | 1.88–1.88 | 10 | 614 | 125 |
| | | 1.3 | 5 | 1.84–1.85 | 10 | 598 | 225 |
| | | | 10 | 1.88–1.88 | 12 | 707 | 500 |
| | TiB₂ | 1.0 | 5 | 1.79–1.80 | — | 757 | — |
| | | | 10 | 1.77–1.78 | — | 1036 | — |
| | | 4.0 | 5 | 1.82–1.83 | 9 | 907 | 230 |
| | | | 10 | 1.87–1.88 | 6 | 863 | 310 |
| | | 1.4 | 5 | 1.82–1.83 | 23 | 676 | 225 |
| | | | 10 | 1.87–1.88 | 20 | 674 | 350 |
| | | 2.3 | 5 | 1.83–1.84 | — | 938 | — |
| | | | 10 | 1.86–1.88 | 10 | 1105 | 375 |
| Ex. 45 | ZrO₂ | 1.0 | 5 | 1.80–1.82 | 32 | 769 | 115 |
| | | | 10 | 1.81–1.82 | 100 | 526 | 250 |
| | ZrC | 0.8 | 5 | 1.82–1.82 | 34 | 805 | 125 |
| | | | 10 | 1.86–1.87 | 41 | 725 | 300 |
| | ZrN | 1.4 | 5 | 1.81–1.82 | 29 | 608 | 100 |
| | | | 10 | 1.87–1.88 | 28 | 523 | 275 |
| | ZrB₂ | 2.0 | 5 | 1.87–1.88 | 36 | 817 | 325 |
| | | | 10 | 1.94–1.95 | 17 | 760 | 400 |
| | | 4.0 | 5 | 1.89–1.90 | 31 | 836 | 275 |
| | | | 10 | 1.96–1.97 | 9 | 1010 | 225 |
| Ex. 46 | Al₂O₃ Fiber | | 5 | 1.75–1.77 | — | 460 | — |
| | | | 10 | 1.73–1.74 | — | 485 | — |
| | ZrO₂ Fiber | | 5 | 1.80–1.81 | 23 | 757 | 65 |
| | | | 10 | 1.82–1.83 | 42 | 642 | 50 |

EXAMPLE 47

The following raw materials were prepared: 28.6% by weight of infusible preliminarily carbonized carbonaceous fiber having the fiber diameter of 15 μm and the fiber length of 0.5 mm and comprising the coal optically isotropic pitch identical to the one employed in Example 1, 66.5% by weight of self-sintering carbonaceous powder comprising the mesocarbon microbeads having the average particle diameter of 6 μm identical to the one employed in Example 1, and 5% by weight of Ti powder having the average particle diameter of 8 μm. The above-mentioned raw materials were mixed uniformly with a mixer, and thereafter a resulting mixture was molded into a composite body having a test piece shape in the size of o 50×10·mm under the molding pressure of 2 ton/cm² identical to that of Exmaple 1.

Then, the composite body was burned by increasing the temperature from an ordinary temperature to 1000° C. at the rate of 150° C./hour, then by maintaining the temperature of 1000° C. for 1 hour, and thereafter by decreasing the temperature from 1000° C. to an ordinary temperature under an ordinary pressure in a nitrogen gas atmosphere. A first sintered body was thus prepared. After measuring the density of the first sintered body, the first sintered body was further burned by increasing the temperature from an ordinary temperature to 1700° C. at the rate of 500° C./hour, then by maintaining the temperature of 1700° C. for 20 minutes, and thereafter by decreasing the temperature from 1700° C. to an ordinary temperature under an ordinary pressure in a nitrogen gas atmosphere. A second sintered body, namely a sliding member of Example 47, was thus prepared.

EXAMPLE 48

A composite body and a first sintered body of Example 48 was prepared by employing the same raw materials and in the same manner as described in Example 47 except that Ni powder having the average particle diameter of 4 μm was employed. After measuring the density of the first sintered body thus prepared, the first sintered body was further burned by increasing the temperature from an ordinary temperature to 1300° C. at the rate of 500° C./hour, then by maintaining the temperature of 1300° C. for 20 minutes, and thereafter by decreasing the temperature from 1300° C. to an ordinary temperature under an ordinary pressure in a nitrogen gas atmosphere. A second sintered body, namely a sliding member of Example 48, was thus prepared.

Evaluation 13

The densities of the thus prepared sliding members of Examples 47 and 48 were measured first. Then, their bending strength were measured by carrying out a bending strength test identical to the one described in Evaluation 11. The results of the measurement are summarized in Table 4. The results of the measurement on the densities of the first sintered bodies of Examples 47 and 48 are also set forth in Table 4. In addition, the measurements on the abrasion amounts and the loads at seizure of the sliding members of Examples 47 and 48 are set forth in Table 5.

TABLE 4

|  | Density (g/cm³), 1st Sintered Body | Density (g/cm³), 2nd Sintered Body | Bending Strength (kgf/cm²), 2nd Sintered Body |
| --- | --- | --- | --- |
| Ex. 47 | 1.67 | 1.79 | 775 |
| Ex. 48 | 1.69 | 1.76 | 810 |

TABLE 5

|  |  | Par. Dia. (μm) | Addi. Amount (% by weight) | Density (g/cm³) | Abrasion Amount (μm) | Bending Strength (kgf/cm²) | Load at Seizure (kgf) |
| --- | --- | --- | --- | --- | --- | --- | --- |
| Ex. 47 | Ti | 8 | 5 | 1.79 | 17 | 775 | 75 |
| Ex. 48 | Ni | 4 | 5 | 1.76 | 14 | 810 | 125 |

It is apparent from Tables 4 and 5 that the bending strength of the sliding member of Example 47 was as high as those of the sliding members of Example 44 in which the inorganic titanium compound was added as the inorganic powder, and that the bending strength of the sliding member of Example 48 exceeded the bending strength exhibited by the sliding member of Example 42 in which nickel boride (NiB) was added as the inorganic powder. Thus, it is expected that the sliding members of Example 47 and 48 can have more favorable properties than those of the conventional sliding member made from the carbon-carbon composite material.

Having now fully described the present invention, it will be apparent to one of ordinary skill in the art that many changes and modifications can be made thereto without departing from the spirit or scope of the present invention as set forth herein.

What is claimed is:

1. A sliding member having a predetermined shape and comprising:
   a sintered body obtained by sintering a composite body comprising:
   preliminarily carbonized carbonaceous fiber which has not been completely carbonized having a length not less than 0.01 mm;
   inorganic powder or inorganic fiber; and
   self-sintering carbonaceous powder with said preliminarily carbonized carbonaceous fiber and said inorganic powder or said inorganic fiber buried therein.

2. The sliding member according to claim 1, wherein said preliminarily carbonized carbonaceous fiber is at least one selected from the group consisting of polymer fiber and pitch fiber.

3. The sliding member according to claim 2, wherein said polymer fiber is at least one selected from the group consisting of polyacrylonitrile fiber and rayon fiber.

4. The sliding member according to claim 2, wherein said pitch fiber is at least one selected from the group consisting of coal pitch fiber and petroleum pitch fiber.

5. The sliding member according to claim 2, wherein said preliminarily carbonized carbonaceous fiber is an optically isotropic pitch fiber or optically anisotropic pitch fiber.

6. The sliding member according to claim 2, wherein said pitch fiber is infusible pitch fiber.

7. The sliding member according to claim 2, wherein said polymer fiber is surface-treated with a viscous material in advance, wherein said viscous material is selected from the group consisting of tar, pitch and an organic polymer.

8. The sliding member according to claim 2, wherein said pitch fiber is surface-treated with a viscous material in advance, wherein said viscous material is selected from the group consisting of tar, pitch and organic polymer.

9. The sliding member according to claim 1, wherein the length and the diameter of said preliminarily carbonized carbonaceous fiber fall in the ranges of 0.01 to 50 mm and 5 to 25 $\mu$m, respectively.

10. The sliding member according to claim 9, wherein said length of said preliminarily carbonized carbonaceous fiber falls in the range of 0.03 to 10 mm.

11. The sliding member according to claim 1, wherein said inorganic powder or inorganic fiber has the melting point of 1000° C. or more and is unreactable with carbon.

12. The sliding member according to claim 11, wherein said inorganic powder or inorganic fiber has the hardness of 1000 Hv or more.

13. The sliding member according to claim 1, wherein said inorganic powder is at least one selected from the group consisting of inorganic oxide, inorganic carbide, inorganic nitride, inorganic boride and metal.

14. The sliding member according to claim 13, wherein said inorganic oxide is at least one selected from the group consisting of $Al_2O_3$, $TiO_2$, $ZrO_2$ and MgO.

15. The sliding member according to claim 13, wherein said inorganic carbide is at least one selected from the group consisting of $B_4C$, TiC, TaC and ZrC.

16. The sliding member according to claim 13, wherein said inorganic nitride is at least one selected from the group consisting of BN, TiN, $Cr_2N$, TaN, AlN and ZrN.

17. The sliding member according to claim 13, wherein said inorganic boride having a diameter of 0.1 to 10 $\mu$m and is at least one selected from the group consisting of $TiB_2$, $ZrB_2$, $B_4C$, NiB, CoB, BN and TaB.

18. The sliding member according to claim 13, wherein said metal is at least one selected from the group consisting of Fe, Mn, Mo, Ni, Nb, Si, V, Ti and W.

19. The sliding member according to claim 1, wherein the average particle diameter of said inorganic powder falls in the range of 0.1 to 5 $\mu$m.

20. The sliding member according to claim 19, wherein said average particle diameter of said inorganic powder falls in the range of 0.2 to 4 $\mu$m.

21. The sliding member according to claim 1, wherein said inorganic fiber is at least one selected from the group of $Al_2O_3$ fiber and $ZrO_2$ fiber.

22. The sliding member according to claim 1, wherein the length and the diameter of said inorganic fiber fall in the ranges of 0.01 to 8 mm and 0.7 to 40 $\mu$m respectively.

23. The sliding member according to claim 22, wherein said length and said diameter of said inorganic fiber fall in the ranges of 0.05 to 3 mm and 1 to 15 $\mu$m respectively.

24. The sliding member according to claim 1, wherein 100 parts by weight of said self-sintering carbonaceous powder is mixed with 2 to 70 parts by weight of said preliminarily carbonized carbonaceous fiber.

25. The sliding member according to claim 24, wherein 100 parts by weight of said self-sintering carbonaceous powder is mixed with 10 to 50 parts by weight of said preliminarily carbonized carbonaceous fiber.

26. The sliding member according to claim 1, wherein said inorganic powder or said inorganic fiber is added by 3 to 30% by weight with respect to the whole amount of the raw materials taken as 100%.

27. The sliding member according to claim 26, wherein said inorganic powder or said inorganic fiber is added by 5 to 10% by weight with respect to the whole amount of the raw materials taken as 100%.

28. The sliding member according to claim 1, wherein said self-sintering carbonaceous powder has the average particle diameter of 30 $\mu$m or less and the $\beta$-resin amount falling in the range of 3 to 50%.

29. The sliding member according to claim 1, wherein said self-sintering carbonaceous powder is coal or petroleum self-sintering carbonaceous powder.

30. The sliding member according to claim 29, wherein said coal or petroleum self-sintering carbonaceous powder is at least one selected from the group consisting of mesocarbon microbeads, pulverized bulk mesophase powder, and pulverized low temperature calcined coke powder.

31. A sliding member having a predetermined shape and comprising:
 a sintered body obtained by sintering a composite body comprising:
 preliminarily carbonized carbonaceous fiber which has not been completely carbonized having a length not less than 0.01 mm;
 boron compound powder having a particle diameter of 0.1 to 10 $\mu$m; and
 self-sintering carbonaceous powder with said preliminarily carbonized carbonaceous fiber and said boron compound powder buried therein.

32. The sliding member according to claim 31, wherein said preliminarily carbonized carbonaceous fiber is at least one selected from the group consisting of polymer fiber and pitch fiber.

33. The sliding member according to claim 32, wherein said polymer fiber is at least one selected from the group consisting of polyacrylonitrile fiber and rayon fiber.

34. The sliding member according to claim 32, wherein said pitch fiber is at least one selected from the group consisting of coal pitch fiber and petroleum pitch fiber.

35. The sliding member according to claim 32, wherein said preliminarily carbonized carbonaceous fiber is an optically isotropic pitch fiber or optically anisotropic pitch fiber.

36. The sliding member according to claim 32, wherein said pitch fiber is infusible pitch fiber.

37. The sliding member according to claim 32, wherein said polymer fiber is surface-treated with a viscous material in advance, wherein said viscous material is selected from the group consisting of tar, pitch and an organic polymer.

38. The sliding member according to claim 32, wherein said pitch fiber is surface-treated with a viscous material in advance, wherein said viscous material is selected from the group consisting of tar, pitch and an organic polymer.

39. The sliding member according to claim 31, wherein the length and the diameter of said preliminarily carbonized carbonaceous fiber fall in the ranges of 0.01 to 50 mm and 5 to 25 $\mu$m respectively.

40. The sliding member according to claim 39, wherein said length of said preliminarily carbonized carbonaceous fiber falls in the range of 0.03 to 10 mm.

41. The sliding member according to claim 31, wherein said boron compound powder is at least one selected from the group consisting of boron carbide, boron nitride, boride of Cr, Ti, Ta, Zr, Al, Ni, Mg, Mn, Fe, V and W, and the metallic states of Cr, Ti, Ta, Zr, Al, Ni, Mg, Mn, Fe, V and W.

42. The sliding member according to claim 31, wherein said average particle diameter of said boron compound powder falls in the range of 0.3 to 5 $\mu$m.

43. The sliding member according to claim 31, wherein 100 parts by weight of said self-sintering carbonaceous powder is mixed with 2 to 70 parts by weight of said preliminarily carbonized carbonaceous fiber.

44. The sliding member according to claim 43, wherein 100 parts by weight of said self-sintering carbonaceous powder is mixed with 10 to 50 parts by weight of said preliminarily carbonized carbonaceous fiber.

45. The sliding member according to claim 31, wherein said boron compound powder is added by 1 to 50% by weight with respect to the whole amount of the raw materials taken as 100%.

46. The sliding member according to claim 45, wherein said boron compound powder is added by 3 to 35% by weight with respect to the whole amount of the raw materials taken as 100%.

47. The sliding member according to claim 31, wherein said self-sintering carbonaceous powder has the average diameter of 30 $\mu$m or less and the $\beta$-resin amount falling in the range of 3 to 50%.

48. The sliding member according to claim 31, wherein said self-sintering carbonaceous powder is coal or petroleum self-sintering carbonaceous powder.

49. The sliding member according to claim 43, wherein said coal or petroleum self-sintering carbonaceous powder is at least one selected from the group consisting of mesocarbon microbeads, pulverized bulk mesophase powder, pulverized bulk mesophase powder and pulverized low temperature calcined coke powder.

50. The sliding member according claim 31, wherein said sliding member exhibits the load of 100 kgf/cm$^2$ or more at seizure under no lubrication condition and has the friction coefficient ($\mu$) of 0.15 or less.

51. The sliding member according to claim 1, wherein said sintered body exhibits an abrasion loss of no more than 40 $\mu$m in an abrasion test conducted under the following conditions with a LFW friction/abrasion tester; oil lubrication, a load of 15 kgf, a speed of 160 r.p.m., a testing time of 15 minutes, and a mating member made of JIS-SUJ2.

52. The sliding member according to claim 51, wherein said abrasion loss is no more than 20 $\mu$m.

53. The sliding member according to claim 51, wherein said sintered body exhibits a friction coefficient falling in the range of 0.05 to 0.5 in a friction test conducted under the following conditions with a LFW friction/abrasion tester; no oil lubrication, a load of 15 kgf, a speed of 160 r.p.m., testing time of 15 minutes, and mating member made of JIS-SUJ2.

54. The sliding member according to claim 53, wherein said inorganic powder is an inorganic oxide, and said friction coefficient falls in the range of 0.25 to 0.5.

55. The sliding member according to claim 53, wherein said inorganic powder is an inorganic carbide, and said friction coefficient falls in the range of 0.15 to 0.35.

56. The sliding member according to claim 53, wherein said inorganic powder is an inorganic nitride, and said friction coefficient falls in a range of 0.1 to 0.35.

57. The sliding member according to claim 53, wherein said inorganic powder is an inorganic boride, and said friction coefficient falls in a range of 0.05 to 0.2.

* * * * *